(12) United States Patent
Strawderman et al.

(10) Patent No.: US 8,556,435 B2
(45) Date of Patent: Oct. 15, 2013

(54) LENS COVERING AND CLEANING APPARATUS

(75) Inventors: Brian Strawderman, Coudersport, PA (US); Cindy Strawderman, Coudersport, PA (US); Herbert F. Ley, Wellsboro, PA (US)

(73) Assignee: Brian Strawderman, Coudersport, PA (US)

( * ) Notice: Subject to any disclaimer, the term of this patent is extended or adjusted under 35 U.S.C. 154(b) by 94 days.

(21) Appl. No.: 13/083,967

(22) Filed: Apr. 11, 2011

(65) Prior Publication Data

US 2011/0249335 A1      Oct. 13, 2011

Related U.S. Application Data

(60) Provisional application No. 61/322,530, filed on Apr. 9, 2010, provisional application No. 61/383,756, filed on Sep. 17, 2010, provisional application No. 61/433,713, filed on Jan. 18, 2011.

(30) Foreign Application Priority Data

Oct. 14, 2010   (CA) ..................................... 2719446

(51) Int. Cl.
*B60R 1/06*  (2006.01)
*G03B 11/04*  (2006.01)
*G02B 23/16*  (2006.01)

(52) U.S. Cl.
USPC ............................ 359/511; 359/507; 359/513

(58) Field of Classification Search
USPC ......................................................... 359/511
See application file for complete search history.

(56) References Cited

U.S. PATENT DOCUMENTS

| 2,583,228 | A | | 1/1952 | Numbers |
| 2,889,629 | A | | 6/1959 | Darkenwald |
| 4,865,191 | A | | 9/1989 | Easter |
| 5,150,528 | A | * | 9/1992 | Shire ................................ 42/129 |
| 5,183,953 | A | | 2/1993 | Anderson et al. |
| 7,198,417 | B2 | * | 4/2007 | Zhang ............................ 396/448 |
| 2002/0167731 | A1 | * | 11/2002 | Watson ......................... 359/611 |
| 2010/0027120 | A1 | * | 2/2010 | Elowitz ......................... 359/511 |
| 2010/0037506 | A1 | | 2/2010 | Carley |

FOREIGN PATENT DOCUMENTS

| JP | 03-235930 | | 10/1991 |
| JP | 03235930 A | * | 10/1991 |
| JP | 05-344396 | | 12/1993 |

* cited by examiner

*Primary Examiner* — Jade R Chwasz
(74) *Attorney, Agent, or Firm* — Gerry J. Elman; Elman Technology Law, P.C.

(57) ABSTRACT

An apparatus including a cap is provided for covering, protecting, removing moisture from, and cleaning a lens of a device such as a scope of a firearm. The inner portion of the apparatus contains a moisture-wicking material. The cap may be manipulated to clean and remove moisture from the lens, such that when the cap is opened, the lens is clean and moisture-free, with the scope ready for use.

21 Claims, 20 Drawing Sheets

LENS COVERING AND CLEANING APPARATUS

CROSS REFERENCES TO RELATED APPLICATIONS

This patent application is related to U.S. Provisional Patent Application Ser. No. 61/322,530, entitled: Lens Covering and Cleaning Apparatus, filed Apr. 9, 2010, the disclosure of which is incorporated by reference herein. In addition, this patent application is related to U.S. Provisional Patent Application Ser. No. 61/383,756, entitled: Lens Covering and Cleaning Apparatus, filed Sep. 17, 2010, the disclosure of which is also incorporated by reference herein. In addition, this patent application is related to U.S. Provisional Patent Application Ser. No. 61/433,713, entitled: Lens Covering and Cleaning Apparatus, filed Jan. 18, 2011, the disclosure of which is also incorporated by reference herein. The benefit from the all of the above-referenced applications is claimed under 35 U.S.C. §119(e). Benefit from the aforementioned applications is proper given that Apr. 9, 2011 is a Saturday and this application is filed on the following Monday, Apr. 11, 2011.

TECHNICAL FIELD

The disclosed subject matter is directed to covers for lenses.

BACKGROUND

Scopes are commonly used on firearms, such as rifles, pistols, and other guns, for example, in the field, while hunting or sport shooting, or on a rifle range or the like, to allow greater accuracy of the shots. During such use, it may become desirable or necessary to clean the lens of the scope, for example, if the lens became dirty from moisture, dust, particles or any combinations thereof. This typically involves the user having to get a lens cloth, handkerchief, tissue or the like, from the user's pocket or other external source, to do the wiping. In some cases, this may be difficult or not possible, as the user's hands may be occupied, wet or dirty, or the user does not have a wiping cloth or the like.

Even where the user has a wiping cloth, it may be dirty or soiled. Should the user desire to wipe the lens with a shirt tail or other part of the user's clothing or outerwear, it may be dirty as well. Moreover, moving the rifle or firearm to be cleaned by the shirt tail or other clothing or outerwear portion may place the rife or firearm in a potentially unsafe position. As a result of the aforementioned situations, scopes are used with unclean or inadequately cleaned lenses, limiting their effectiveness.

SUMMARY

The disclosed subject matter includes an apparatus that protects scopes for firearms, such as rifles, pistols and guns, binoculars, telescopes, cameras, or any other instruments with at least one exposed lens. The apparatus allows for the lens to be cleaned while the scope (on the rifle, gun, pistol, firearm, or the like) is in use, for example, in the field, while hunting or sport shooting, or sighting and shooting on a rifle range, or during the viewing use of binoculars, telescopes, cameras or the like. The aforementioned use in the field is commonly referred to as "field use." The apparatus includes a removable cover for the end of the scope, including the lens, and includes a cap adapted to cover and protect the lens, as well as dry and clean the lens. Advantageously, this eliminates the need for the user to carry additional lens-cleaning items, such as lens cloths, handkerchiefs, tissues, cleaning fluids and solids, or the like. The apparatus may remain on the scope when it is not in use.

The aforementioned cap is of an absorbent material. The cap covers the lens on one side, and depending on the position of the lens in the scope, the cap is either forced into contact with the lens, or is in close proximity to the lens when the cap is closed and secured over the lens. The apparatus, including the cap, is such that it is slid over the end of the scope, to cover and engage the scope in a frictionally snug manner. Once in place, the apparatus remains securely attached to the scope. The cap is movable between closed and open positions, and when in the open position, remains held in the open position, such that the scope may be utilized with the apparatus remaining on the end of the scope. When returned to the closed position, the cap is held snugly, such that it either contacts the lens, or is in close proximity thereto, depending on the position of the lens in the scope. In its closed position, the cap can be used for absorbing moisture and clearing debris and particles from the lens.

An embodiment of the present invention is an apparatus including a cap, adapted to cover, protect, dry and/or clean a lens of a device such as a scope of a firearm. In the closed position, the cap may be manipulated to dry and/or clean the lens, such that when the cap is opened, the lens is dry and clean, with the scope ready for use.

Another embodiment is directed to an apparatus for removal of matter from a lens. The matter may be moisture, dust, particulate debris, or combinations thereof. The apparatus includes a tubular member including a body adapted to fit over the end of a scope, and a cap, securable to the body such that it can move between an open position and a closed position, the cap being dimensioned to be extendable into the body, such that the cap can be placed into contact with the lens of the scope. The cap includes a portion of material adapted to absorb moisture when in contact with the lens.

Another embodiment is directed to an apparatus adapted to remove matter from the lens of a viewing device. The apparatus includes a tubular body operatively coupled with a cap. For example, the cap is attached to the body in a hinged manner, allowing for pivotal movement of the cap. The tubular body is adapted for positioning and retention over an end of the viewing device proximate to the lens. The cap is dimensioned to be movable with respect to the body. More particularly, the cap is adapted to move between positions including a position where the cap covers the lens, and a position where the cap is maintained at least substantially clear of the lens, such that the apparatus may remain on the viewing device while the viewing device is in use. The cap is securable to the body in the aforementioned positions.

Within the scope of the term "viewing device" are a scope for a rifle, gun, pistol, firearm, and the like. The term "viewing device" also includes binoculars, telescopes, cameras, and the like. In a further embodiment, the cap is attached to the body by a hinge that that contains a spring which biases the cap in an open position. Further to this embodiment, opposite the hinge on the body and the cap are corresponding magnets which secure the cap in the closed position when the cap is closed. Further, the outer portion of the cap includes a finger grip portion or recessed portion on the outside surface of the cap. The finger grip portion or recessed portion is adapted to allow a person to insert a finger into the portion and easily move and manipulate a support member located on the inner portion of the cap. The support member includes a layer of material affixed thereto. Movement of the support member, and in turn, the layer of material, against the lens of the viewing device allows the person to remove matter from and generally clean the lens of the viewing device when the cap is in the closed position.

Another embodiment is directed to a method for removing matter from the lens of a viewing device. The method includes providing an apparatus comprising a tubular body coupled to a cap. The tubular body is adapted for positioning and retention over an end of the viewing device proximate to the lens. The cap is adapted to be movable with respect to the body, between positions including a position where the cap covers the lens, and a position where the cap is maintained at least substantially clear of the lens, such that the apparatus remains on the viewing device while the viewing device is in use. The viewing device includes, for example, a scope for a rifle, gun, pistol, and firearm, and the like. The viewing device may also include binoculars, telescopes, cameras, and the like.

BRIEF DESCRIPTION OF THE DRAWINGS

Attention is now directed to the drawing figures, where like or corresponding numerals indicate like or corresponding components. In the drawings:

In FIG. 3C, the cap is secured to the body in the open position;

DETAILED DESCRIPTION OF THE INVENTION WITH REFERENCE TO THE DRAWINGS

Figure 1:
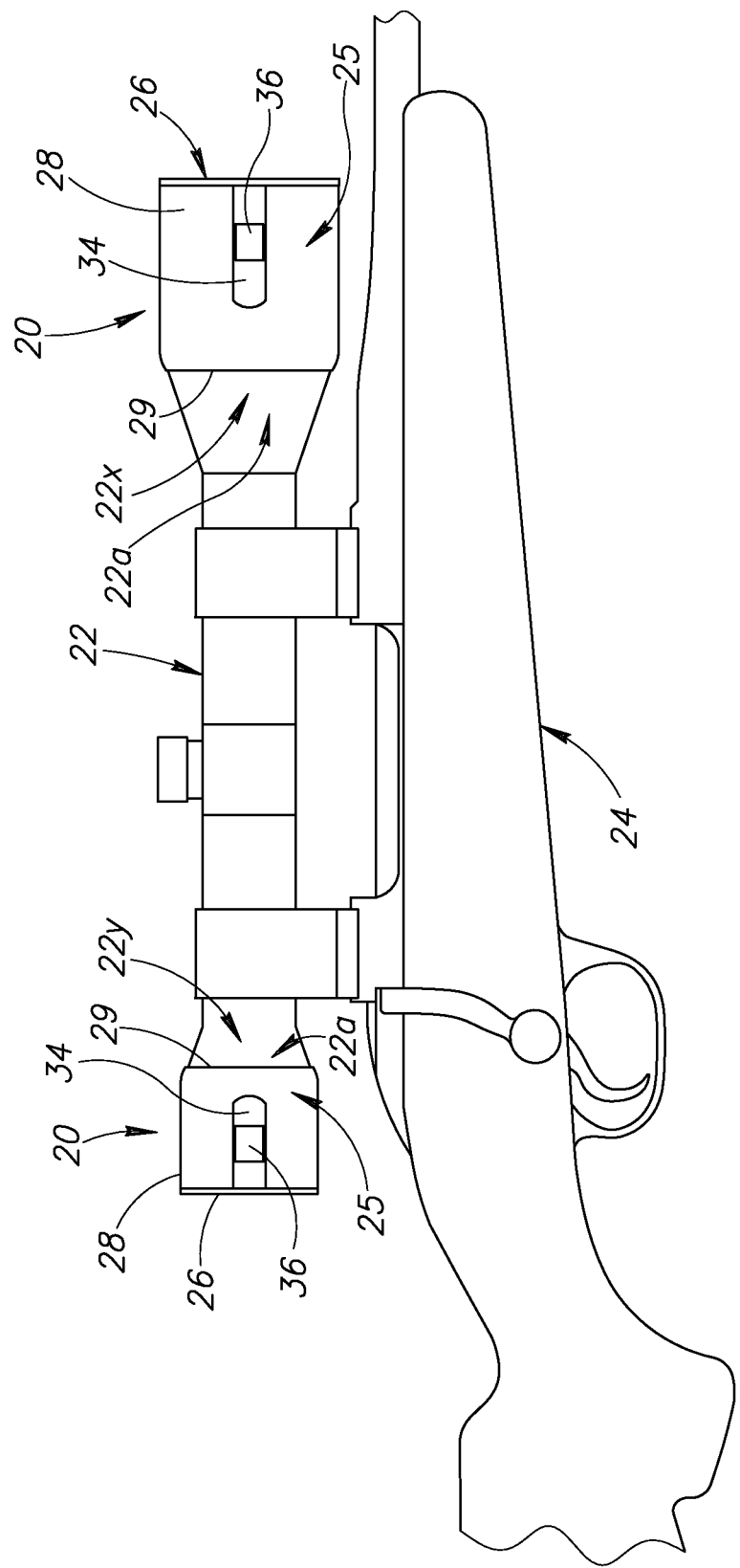
FIG. 1 is an elevation view showing the two embodiments of the apparatus, each in use on opposite ends of a rifle scope.

FIG. 1 shows an embodiment of the apparatus 20 on the scope 22 on a rifle 24. This embodiment of the apparatus 20, includes a body 25 in the shape of a cylindrical sleeve. The body 25 is dimensioned to fit over, cover, and, remain on the scope body 22a. A cap 26 attaches to the body 25 at the distal end 28 of the body 25. The attachment is such that the cap 26 is movable with respect to the body 25. In this embodiment, the cap 26 is attached to the body 25 in a hinged manner. This hinged attachment is formed by a flange 27 (shown in FIG. 2) connected to the body 25 and the cap 26. More specifically, the edge 25e (shown in FIGS. 3A and 3B) of the body 25 attaches to flange 27. Flange 27 attaches to the edge 26e (shown in FIGS. 3A and 3B) of the cap 26. The edges 25e, 26e are joined to the flange 27 by stitching, adhesives or the like. In other embodiments, the respective edges 25e and 26e may be joined directly to form an attachment. The cap 26 covers the lens 22b, as shown, for example in FIGS. 4, 6A and 6B.

The apparatus 20 is adapted to operate on one or both of the respective ends 22x, 22y of the scope 22. The apparatus 20 may be dimensioned to accommodate each end 22x, 22y of the scope 22. In accordance with the disclosure herein, the apparatus 20 may also be dimensioned for other viewing devices. The apparatus 20 is such that proximal end 29 of the body 25 is open, so as to receive the scope end 22x or 22y, and be slid thereover. Both the distal 28 and proximal 29 ends of the body 25 of the apparatus 20 are flexible, and are, for example, elasticized, typically at their edges (e.g., circumferentially). The flexible material used at the elasticized ends is, for example, neoprene or other rubber bands. These elasticized ends 28 and 29 allow the body 25 of apparatus 20 to fit snugly over the respective ends 22x, 22y of the scope body 22a. Once in position, the apparatus 20 is securely retained on the scope body 22a. The cap 26 can be secured in a closed position, as shown in FIG. 1.

Figure 2:
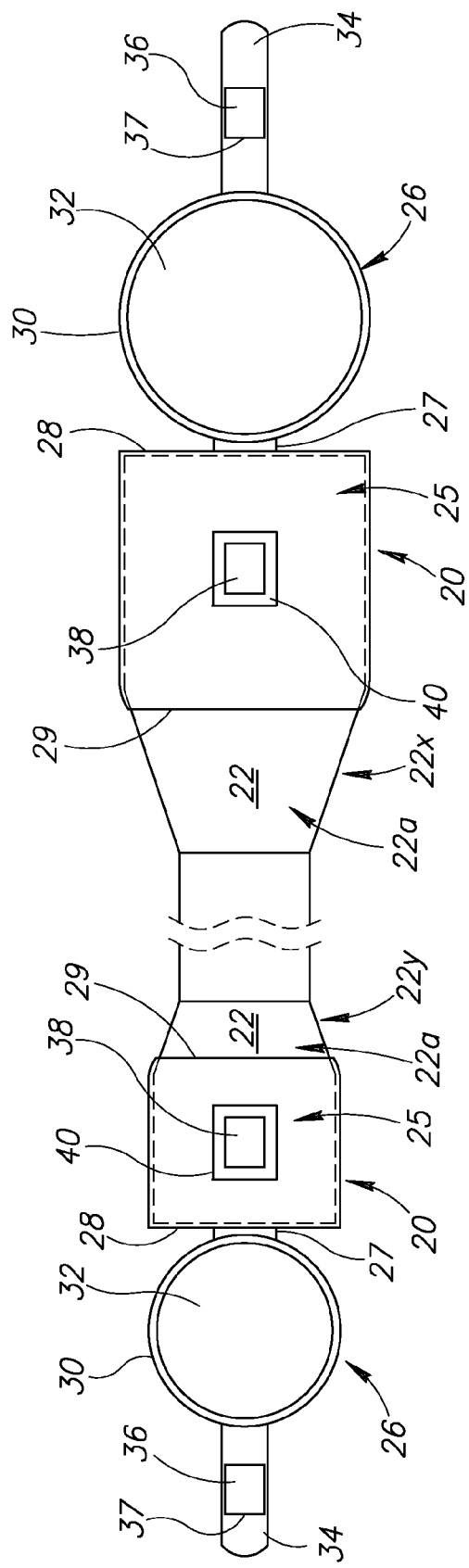
FIG. 2 is an elevation view of two embodiments of the apparatus, each on an opposite end of a rifle scope. The cap on each embodiment is in the open position.

FIG. 2 shows the apparatus 20 with the cap 26 extended from body 25. FIG. 2 exemplifies the apparatus 20 in use at end 22x of scope 22. Similarly a second apparatus 20 of the same type is in use at end 22y of scope 22. The cap 26 includes an outer portion 30 and an inner portion 32. The outer portion 30 serves as a cover for the lens 22b (shown in FIG. 6A) while the inner portion 32 contacts the lens 22b (shown in FIG. 6A), or is in close proximity thereto (depending on the position of the lens 22b in the scope 22). The inner portion 32, when contacted by the lens 22b or wiped against it, removes matter (e.g., moisture, dust, particulate debris, or combinations thereof) from the lens 22b. This results in the lens 22b being dried and/or cleaned, for maximal viewing through scope 22. The inner portion 32 is, for example, of a water-absorbing, moisture-wicking, and/or debris-attracting material. When placed into contact with the lens 22b or wiped against the lens 22b, the inner portion 32 will not scratch or cause other damage to the lens 22b. This material is, for example, microfiber, natural or synthetic chamois cloth, or the like.

The cap 26 is bendable. A tab 34 extends from the cap 26. The tab 34 includes one or more magnet(s) 36, enclosed in a pocket 37 or holder. As shown in FIGS. 3B and 3C, each magnet 36 is polarized to be attracted to and engage with a corresponding magnet 38, 39, enclosed in pockets 40, 41 or holders, in the sides of the body 25. The pockets 40, 41 are oriented approximately 180 degrees from each other. The body 25 is made of flexible material such as fabric, preferably a waterproof fabric, and the outer portion 30 of the cap 26 is typically, for example, of the same material as the body 25. In other embodiments, the flexible material of the body and cap includes rubber and/or silicone. The length of the body 25 of the apparatus 20, from the distal end 28 to the proximal end 29, may be any length, as required by the corresponding viewing device. To work best, the body 25 is slightly greater than the respective scope ends 22x and 22y. The elasticized ends of the apparatus 20 maintain the engagement of the apparatus 20 over the scope body 22a.

Figure 3A:
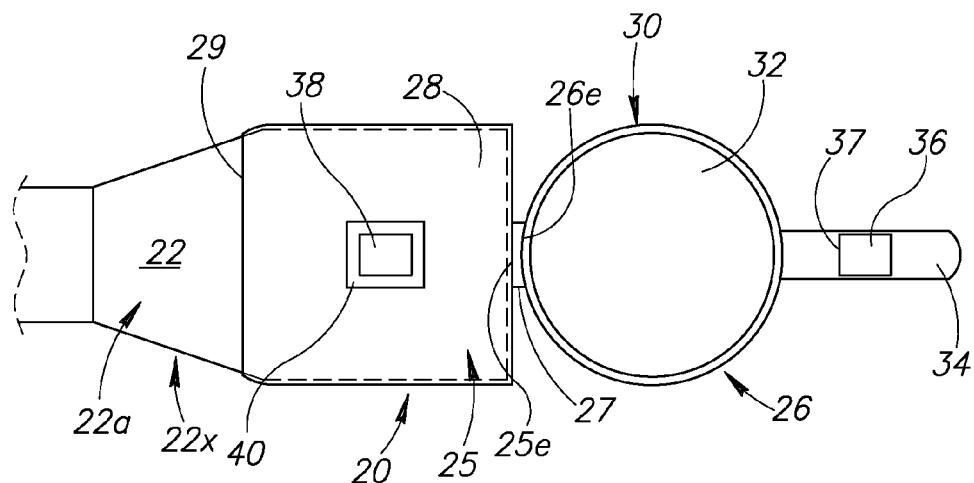
FIG. 3A is an elevation view showing the apparatus on one end of a scope, with the cap open.
Figure 3B:
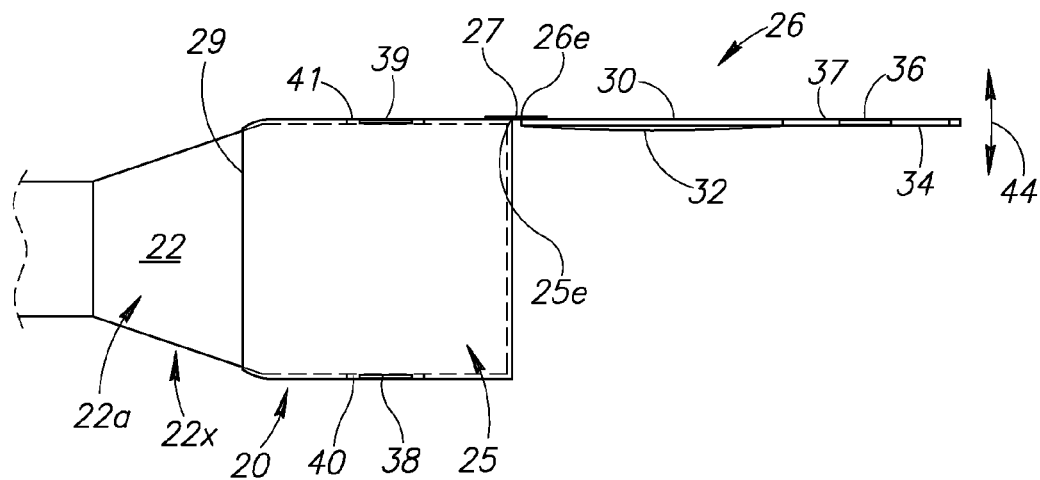
FIGS. 3B and 3C are plan views showing the apparatus with the cap open.
Figure 3C:
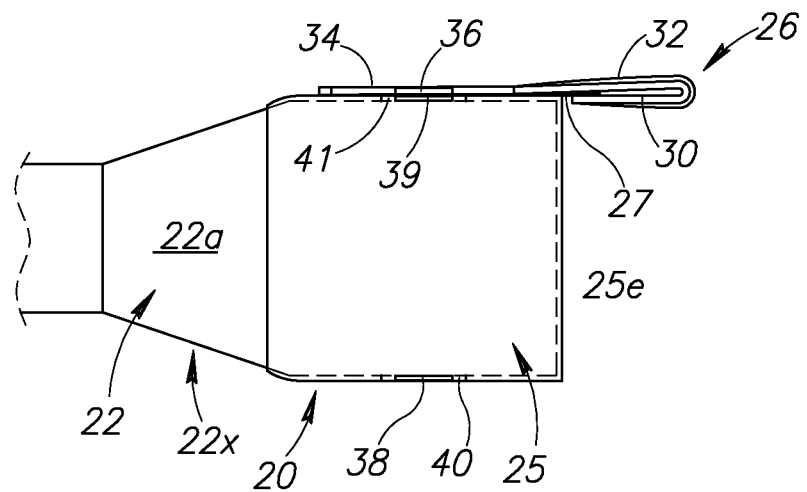

FIGS. 3A and 3B show the apparatus 20 with the cap 26 in the open position. In FIGS. 3A and 3B, as well as FIGS. 3C, 4, 5, 6A, and 6B, the apparatus 20 is shown on one end 22x of the scope 22. As should be understood, the embodiment of the apparatus 20 is exemplary of many types of apparatus in accordance with the present invention. The cap 26 is movable in the directions of the double-headed arrow 44 shown in FIG. 3B. As shown in FIG. 3C, the cap 26 is secured in the open position, with the magnet 36 of tab 34, and magnet 39 of the body 25 in magnetic contact with each other. This is because magnets 36 and 39 have opposite polarities. In the positions shown in FIGS. 3A-3C, the cap 26 is clear of the lens 22b of the scope 22, and does not obstruct the view through the scope 22.

Figure 4:
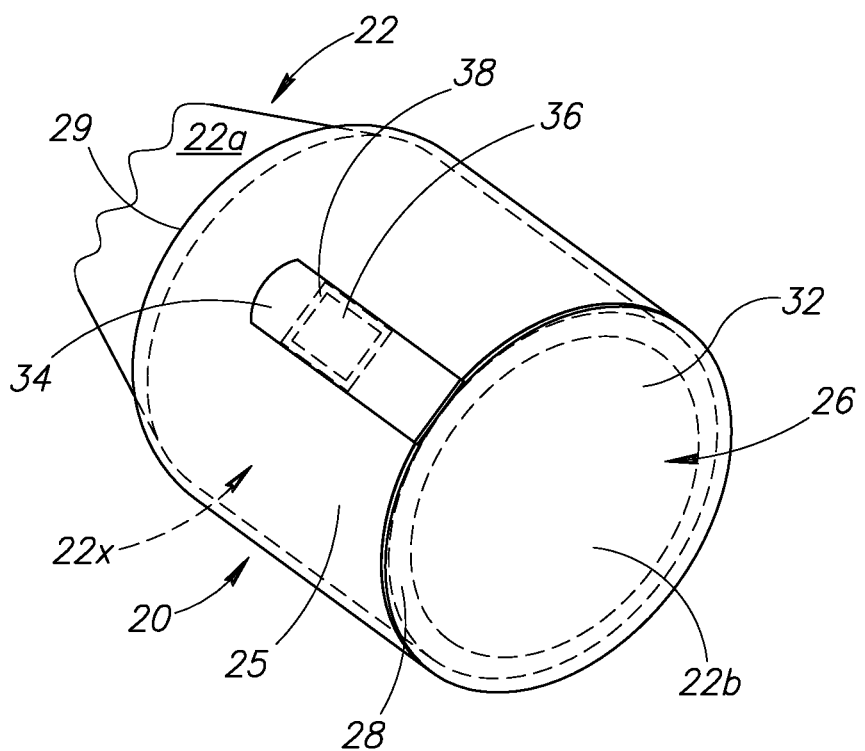
FIGS. 4 and 5 are perspective views of the apparatus with the cap secured to the body in the closed position.
Figure 5:
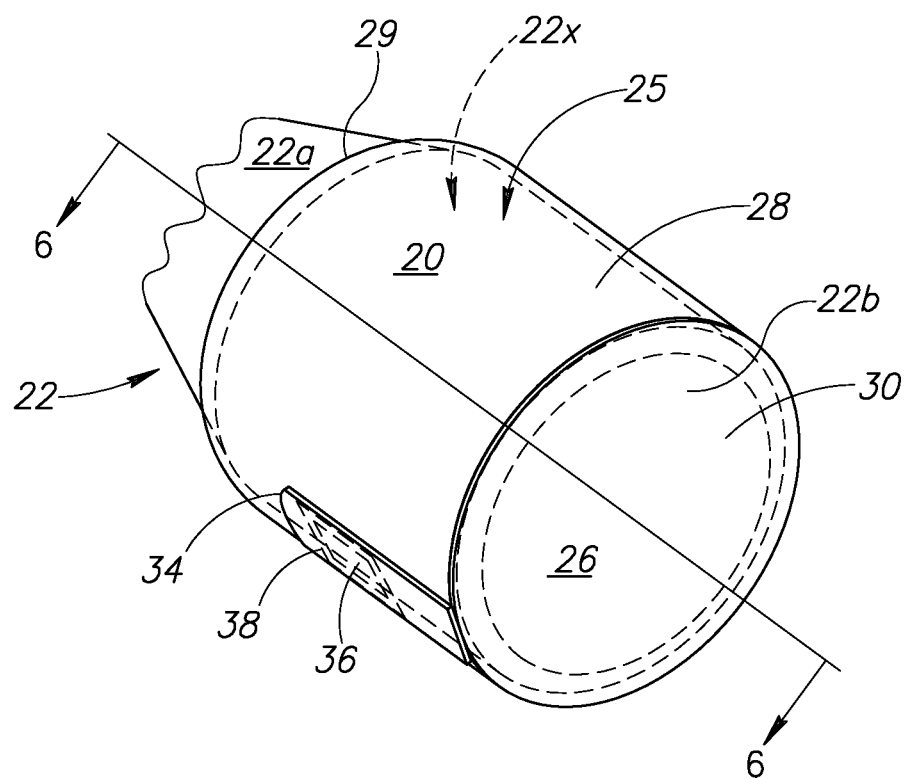
Figure 6A:
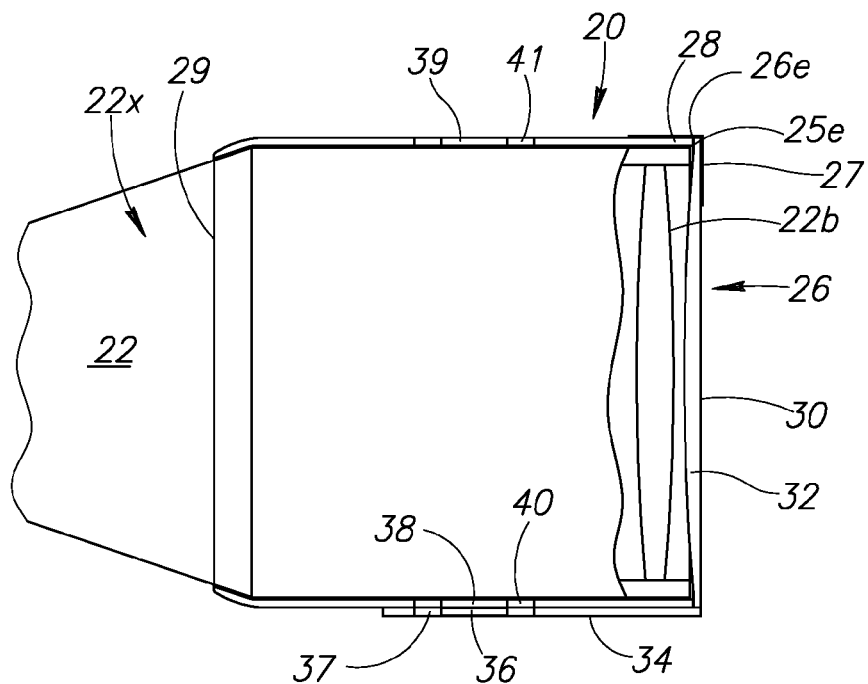
FIG. 6A is a plan view of the apparatus with the cap closed and secured to the body. This figure includes a partial cross-sectional portion taken along line 6-6 of FIG. 5.

FIGS. 4 and 5 show the cap 26 secured in the closed position, preventing moisture and debris from contacting the lens 22b (shown in FIG. 6A). The tab 34 is held in place along the side of the body 25, as magnet 36 of the tab 34, and magnet 38 of the body 25 are in magnetic contact. Again, magnets 36 and 38 have opposite polarities, and therefore are attracted to each other. The magnetic contact, secures the cap 26 in the closed position. This magnetic engagement pulls the cap 26 toward the body 25, holding the cap 26 in close proximity to the lens 22b, as shown in FIG. 6A. In a scope where the lens 22b is at the edge of the scope 22 (i.e., not recessed in the scope 22, but flush with the edge of the scope 22), the cap 26 is in contact with the lens 22b.

Figure 6B:
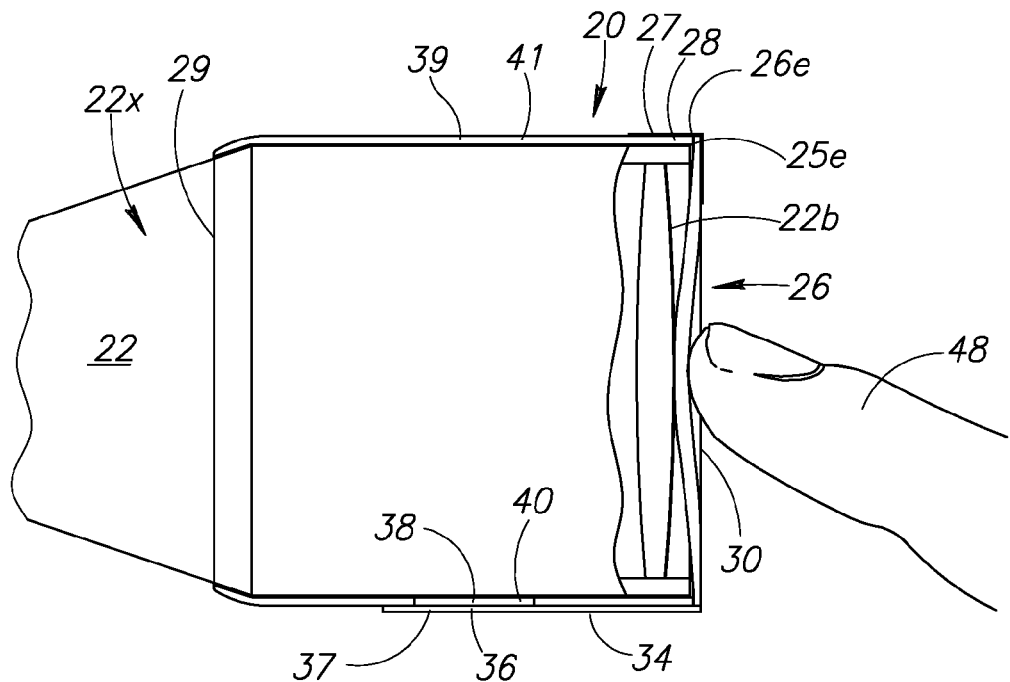
FIG. 6B is a plan view of the apparatus of FIG. 6A, with the cap closed and secured. This figure includes a partial cross-sectional portion taken along line 6-6 of FIG. 5, in an exemplary cleaning operation.

When the material of the inner portion 32 of the cap 26 contacts the lens 22b, moisture may be wicked from the lens 22b, drying the lens 22b. Additionally, the cap 26 is of a diameter larger than that of the distal end 28 of the body 25. This allows a user to apply manual pressure to the cap 26, and use a wiping action on the cap 26 to clean and/or dry the lens 22b. For example, by pressing the cap 26 into contact with the lens 22b, as represented by the finger 48 (shown in FIG. 6B) pressing the cap 26 into contact with the lens 22b, the lens 22b is manually dried and/or cleaned. This would also be true in configurations where the cap 26 is always in contact with the lens 22b, due to the lens 22b being located flush with the edge of the scope 22, instead of being recessed from the edge, as shown in FIG. 6B.

The cap 26 is such that there is sufficient material of the cap 26 to accommodate the aforementioned wiping action, for drying and/or cleaning the lens 22b, without stretching or otherwise compromising the material of the body 25, without causing the body 25 to move significantly on the scope end 22x, such that the apparatus needs to be repositioned on the scope end 22x upon cleaning the lens 22b, and/or without causing the body 25 to move off of the scope end 22x. Moisture and debris may also be wiped from the lens 22b by manually manipulating the cap 26 into contact with the lens 22b. This can be done, for example, in a wiping action, when the cap 26 is disengaged from the closure formed by the tab 34, tab magnet 36, and body magnet 38, or disengaged from the holder formed by the tab 34, magnet 36, and magnet 39.

Alternatively, the cap 26 can be held in the aforementioned open and closed positions by hook and loop materials (e.g., Velcro®). In yet other embodiments, other mechanical or chemical (e.g., adhesives) fasteners may be used to secure the cap 26 to the body 25, provided they also allow for manual release when use of the scope 22 is desired. The apparatus 20 may be modified for a variety of scope sizes, scope end sizes, and instruments having lenses, such as camera lenses and cameras, telescopes, binoculars, opera glasses, and the like. In other alternatives, the elasticized material at the distal end 28 can be replaced with a metal or plastic ring of a diameter smaller than that of the scope 22, so as to maintain the apparatus 20 on the scope 22, and end 22x and/or end 22y.

Figure 7:
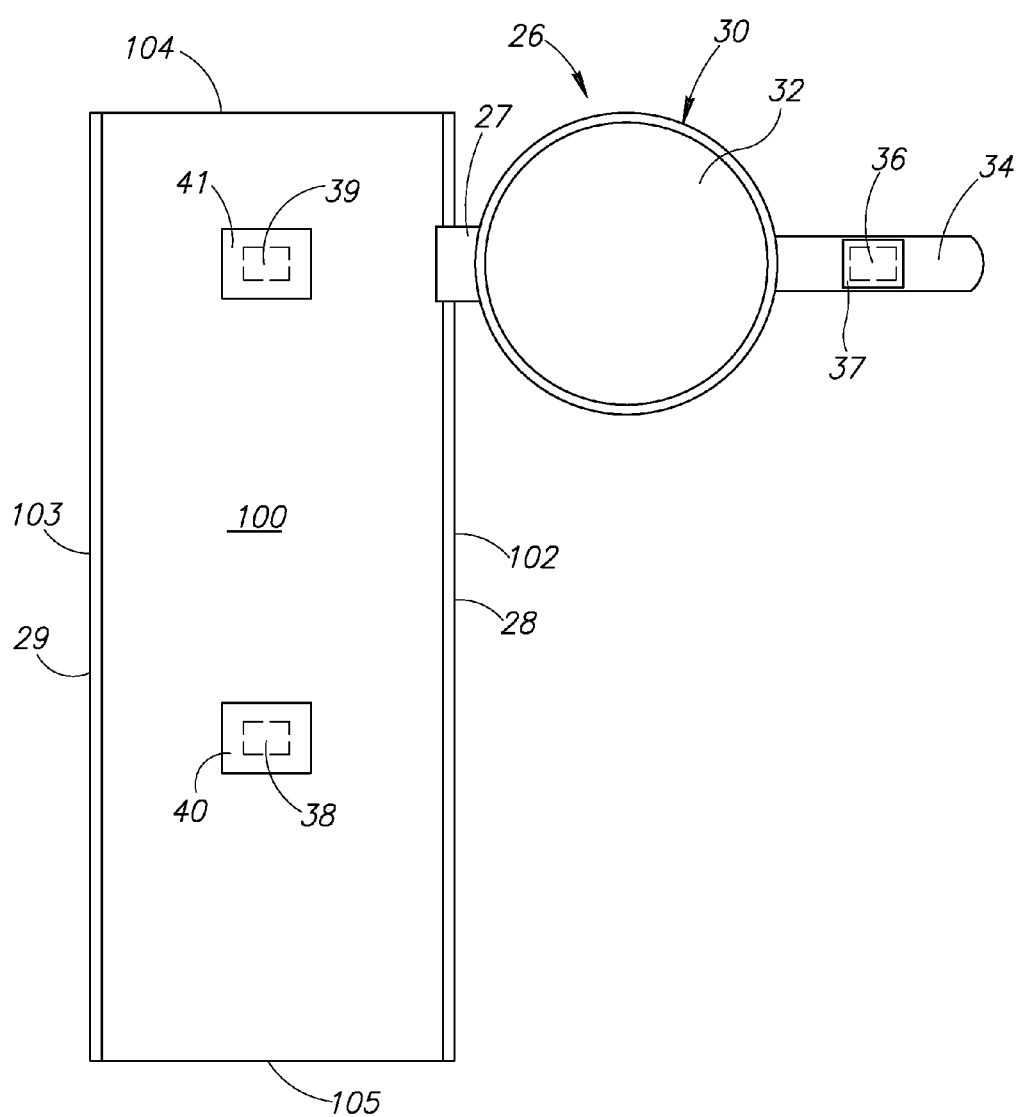
FIG. 7 is a front view of the apparatus during the manufacturing process.

FIG. 7 shows an embodiment of the apparatus 20 at a stage in its manufacture. Initially, the apparatus 20 is a sheet of material 100 with ends 102, 103. Ends 102 and 103 form the distal end 28 and proximal end 29, respectively, of body 25, as shown in FIGS. 1-6B). Each end 102 and 103 is folded over an elastic band and joined to the sheet 100 so as to enclose the elastic bands. Joining of the ends 102 and 103 to the sheet 100 is accomplished through techniques such as sewing and the like. The folded over and joined ends 102 and 103 define the distal end 28 and proximal end 29 of the body 25. In a different manufacturing process, a metal ring may instead be used at either or both of the distal end 28 and proximal end 29 of the body 25 to maintain the apparatus 20 on the scope 22.

The cap 26 includes an inner portion 32 joined to an outer portion 30, and a tab 34. A pocket 37 within the tab 34 encloses a magnet 36. Magnets 38, 39 are enclosed in pockets 40, 41 on the sheet 100. The aforementioned pockets 37, 40, 41 are formed by conventional techniques. The magnets 36, 38, 39 are secured in their corresponding pockets 37, 40, 41 by sewing and/or adhesives. The pockets 37, 40, 41, are closed by sewing, adhesives or the like.

The ends 104, 105 of the sheet 100 are fastened together, forming the tubular body 25, by sewing or the like. Magnets 38, 39 and their respective pockets 40, 41 or holders, are oriented approximately 180 degrees from each other on the completed body 25. The cap 26 is attached to the sheet 100, when the sheet 100 is still flat or once it has been formed into the tubular body 25. The cap 26 is attached at the end 102 of sheet 100, which is also the distal end 28 of body 25. The cap 26 is attached via flange 27, through sewing, adhesives, welding, or the like.

Figure 8A:
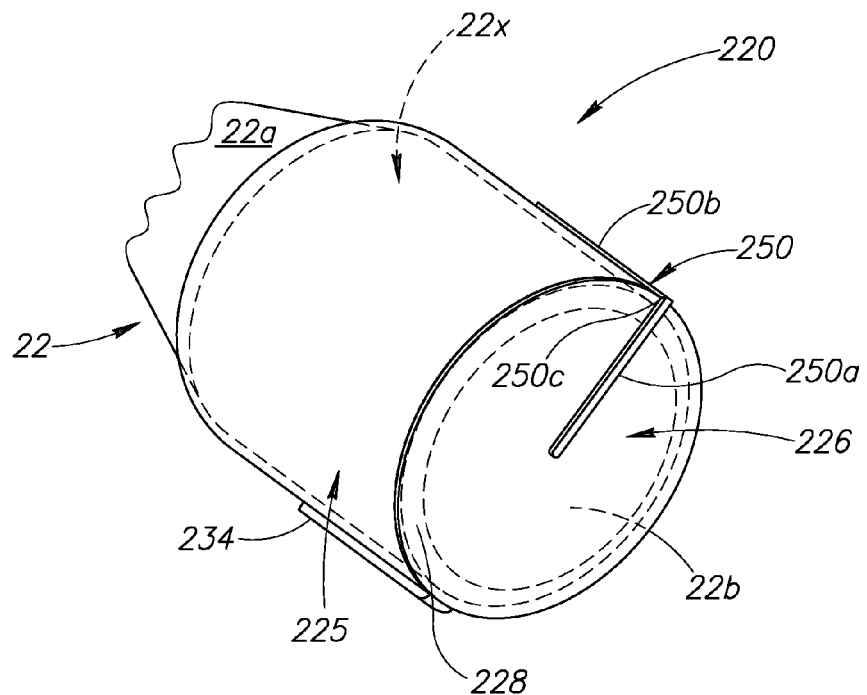
FIG. 8A is a perspective view of another embodiment of the apparatus, with the cap in the closed position.
Figure 8B:
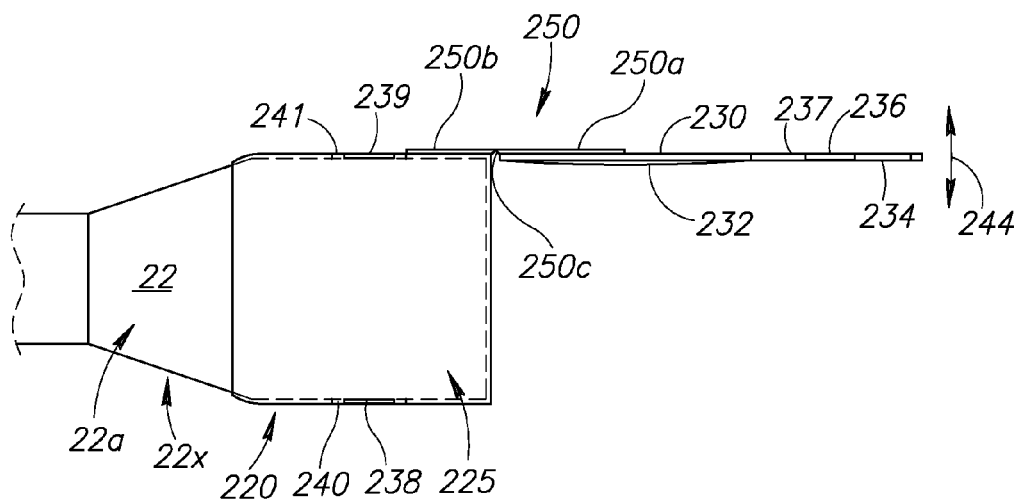
FIG. 8B is a plan view of the embodiment of the apparatus of FIG. 8A, with the cap open.

FIGS. 8A and 8B show another embodiment of an apparatus 220 in accordance with present invention. Apparatus 220 includes components comparable to those of apparatus 20 described above, numbered correspondingly in the 200s. The cap 226 attaches to the body 225 in a hinged manner, by a resilient member 250. The resilient member 250 is constructed to behave in a spring-like manner, and is biased outward, such that the cap 226 is in the open position of FIG. 8B.

Figure 8C:
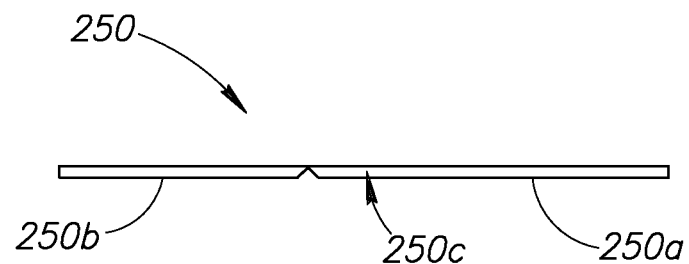
FIG. 8C is a plan view of the resilient member of the embodiment shown in FIGS. 8A and 8B.

As shown in FIG. 8C, the resilient member 250 is a single piece, formed of two sections 250a, 250b, separated by an indented portion 250c or other weakened portion. The indented portion 250c allows for bending of the resilient member 250. The resilient member 250 is formed of a resilient material, such as plastic or the like, which gives it a spring-like behavior. One section 250a is attached to the cap 226, while the other section 250b is attached to the body 225. The resilient member 250 allows for movement of the cap 226 between the closed position and open position. The closed position is shown in FIG. 8A. Magnet 236 of the tab 234 engages with magnet 238 of the body 225 to secure the cap 226 in the closed position. The open position is shown in FIG. 8B. Movement between these positions is indicated by the double headed arrow 244 of FIG. 8B. The resilient member 250 biases the cap 226 outward to an open position, where the resilient member 250 is in a planar orientation, as shown in FIG. 8B.

Figure 8D:
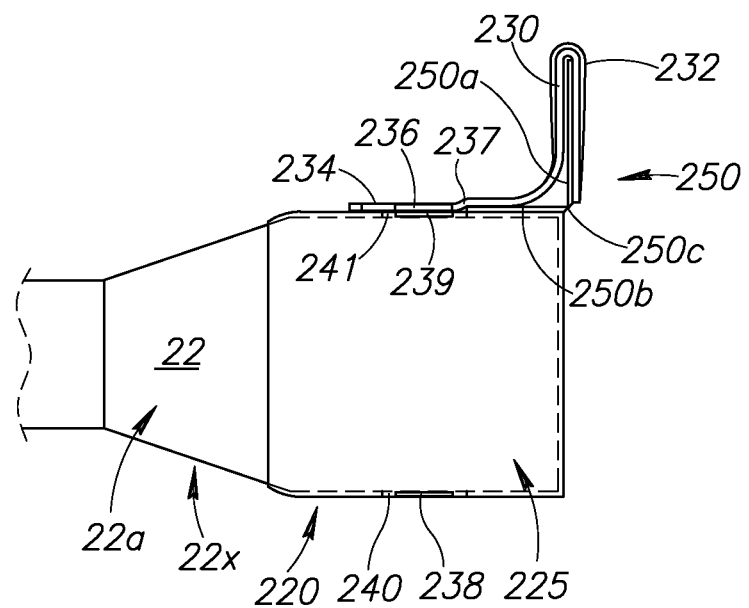
FIG. 8D is a plan view of a the embodiment of the apparatus of FIGS. 8A and 8B, with the cap secured in an open position.

The cap 226 may also be attached to the body 225 by stitching and/or other joining methods at the respective ends of the cap 226e and body 225e for additional security. In accordance with the cap 26, body 25 and apparatus 20 detailed above, the resiliency of the resilient members 250 allows the cap 226 to be clear of the scope 22, when the cap 226 is in the open position, as shown in FIG. 8B. In the closed position, with tab 234 secured to the body 225 by cooperating magnets 236 and 238, the cap 226 covers the lens of the scope 22. The body 225 may also include a magnet 239, similar to magnet 39 of body 25, for holding the cap 226, via the tab 234, in an open position, as shown in FIG. 8D.

FIGS. 9A-9D show another embodiment of an apparatus 320 in accordance with the present invention. Apparatus 320 includes components comparable to those of apparatus 20 described above. These comparable components are numbered correspondingly in the 300s. The apparatus 320 is includes a body 325, which, in this embodiment, is a tubular sleeve of a flexible material. The flexible material may be a silicone, rubber, or the like. The body is formed through molding. The body 325 is of sufficient rigidity such that it slides over an end of a scope, such end 22x of scope 22 of FIG. 1. Once the body 325 is slid into place over the scope 22, the apparatus 320 stays in place due to the frictional engagement with the scope 22.

Figure 9B:
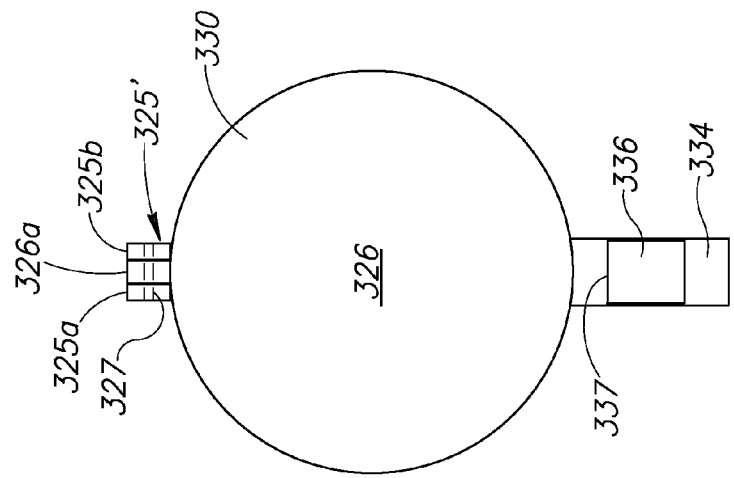
FIG. 9B is a front view of the embodiment of the apparatus of FIG. 9A.
Figure 9A:
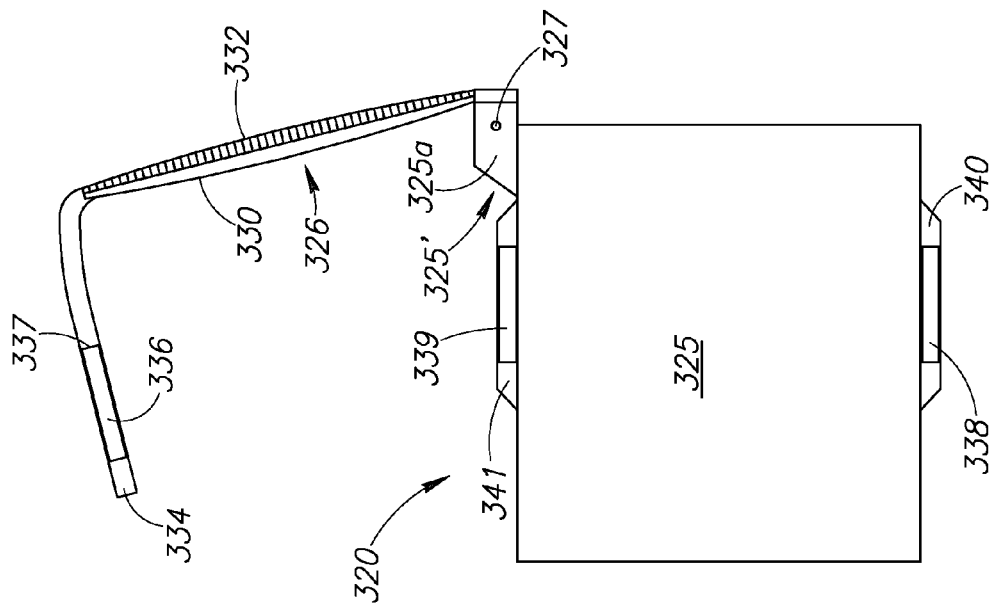
FIG. 9A is a plan view of an another embodiment of the apparatus, with the cap open.

The cap 326 of apparatus 320 is shown in an open position in FIG. 9A. In this particular view, the cap 326 is not secured into an open position. As shown in FIG. 9B, a receiver 325', formed of oppositely-disposed members 325a and 325b, extends from the body 325 and receives an arm 326a of the cap 326. A pin 327 provides a movable attachment of the arm 326a to the oppositely-disposed members 325a and 325b. The body 325 includes magnets 338 and 339 mounted directly to the body 325 in protruding shoulder holders 340 and 341, respectively. There magnets 338 and 339 may be mounted to the body 325 by molding, adhesives, or combinations thereof. In other embodiments, the magnets 338 and 339 may be located in pockets or other retaining structures.

Magnet 336 is in a pocket 337 in tab 334. In other embodiments, multiple magnets are located in pocket 337. Tab 334 extends from the cap 326 as shown in FIGS. 9A and 9B. The cap 326 also includes an outer surface 330 of a silicone, rubber, or other polymeric sheet. Accordingly, the outer surface 330 is flexible and allows for wiping and other cleaning of the lens of a scope or other viewing device. The inner surface 332 of the cap 226 is similar in all aspects, including, construction, materials, and dimensioning to the cap 26 detailed above, and shown in FIGS. 1-7.

Figure 9C:
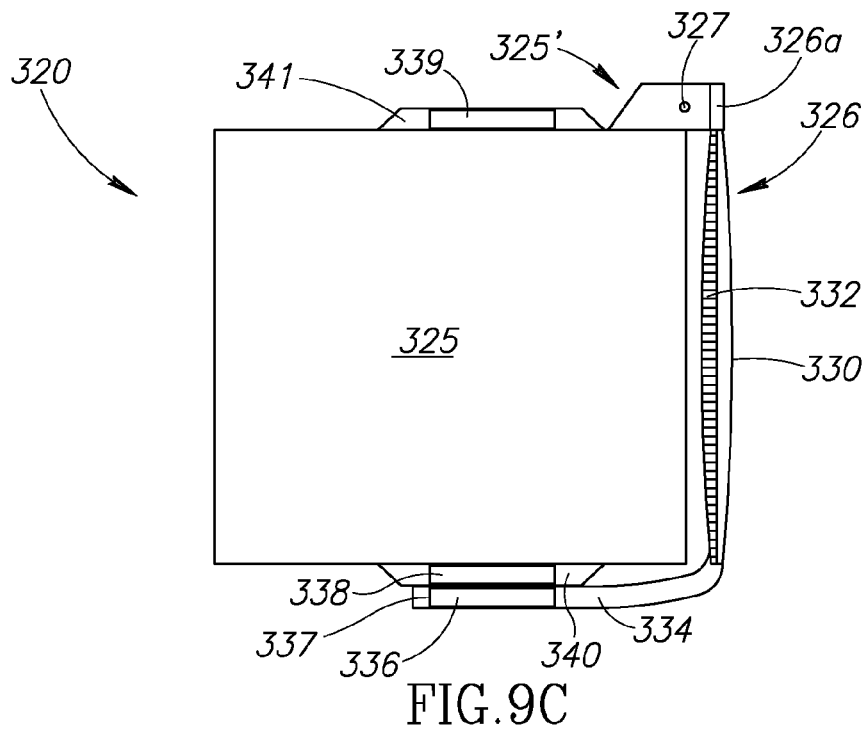
FIG. 9C is a plan view of the embodiment of the apparatus of FIG. 9A, with the cap held and secured in the closed position.
Figure 9D:
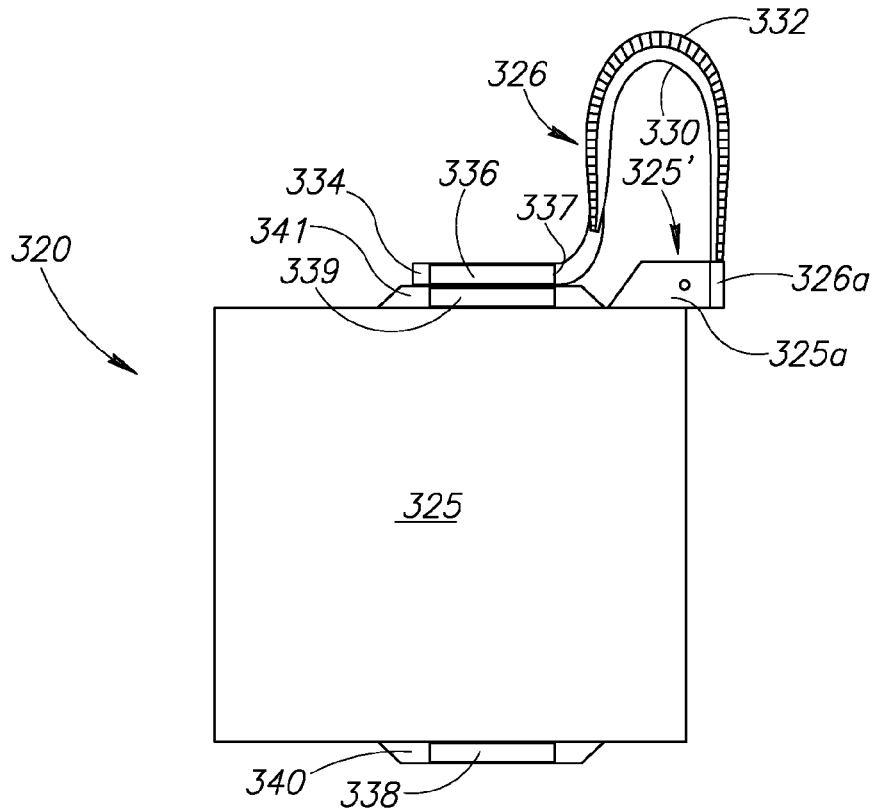
FIG. 9D is a plan view of the embodiment of the apparatus of FIG. 9A with the cap held and secured in the open position.

In other embodiments, the outer surface 330 of the cap 326 may be in accordance with the outer surface 30 of the cap 26 detailed and shown in FIGS. 1-7 above. The magnet 336 of the tab 334 engages with magnet 338 of the body 325 when the cap 326 is in the closed position. This causes the cap 326 to be secured in the closed position, as shown in FIG. 9C. Likewise, to secure cap 326 in the open position, as shown in FIG. 9D, magnet 336 engages with magnet 339 in the side of the body 325.

Figure 10A:
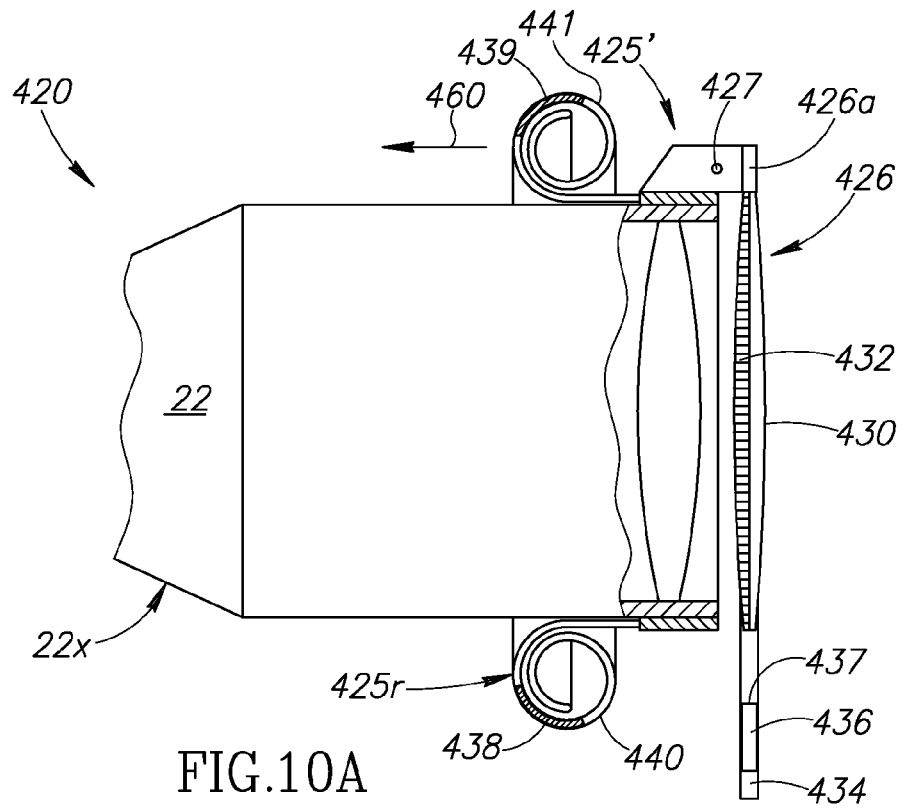
FIG. 10A is a plan view of another embodiment of the apparatus, with a body that is rolled onto a scope for use thereon, including a partially cut-away cross-sectional portion.

FIG. 10A shows the apparatus 420, which is similar to the apparatus 320 of FIGS. 9A-9D, in construction and components, except where indicated. That is, receiver 425', pin 427, arm 426a, cap 426, inner surface 432, outer surface 430, pocket 437, tab 434, and magnet 436 are similar in form and function to receiver 325', pin 327, arm 326a, cap 326, inner surface 332, outer surface 330, pocket 337, tab 334, and magnet 336. The apparatus 420 includes a body 425r made of a resilient, flexible material, such as a silicone, rubber, or the like. The body 425r is adapted to be rolled onto and rolled of off the scope 22. As shown in FIG. 10A, the body 425r is in the process of being rolled onto or rolled off of end 22x of scope 22. Magnets 438 and 439 are flexible and are flush with the outer surface of the body 425r. The magnets 438 and 439 are held in respective pockets 440 and 441 by friction, and preferably, also by adhesives. The magnets 438 and 439 may also be formed into the body 425r during molding of the body 425r. The flexibility of the magnets 438 and 439 facilitates the unrolling and rolling of the body 425r.

The body 425r is unrolled in the direction of the arrow 460. When removal and/or storage is desired, the body 425r is rolled back up in the opposite direction. That is, when disengagement of the apparatus 420 is desired, the body 425r can be rolled off of the scope 22 and stored in this rolled position, minimizing storage space. The rolled position allows the apparatus 420 to be easily stored in a pocket of clothing, a gun case, or the like.

Figure 10B:
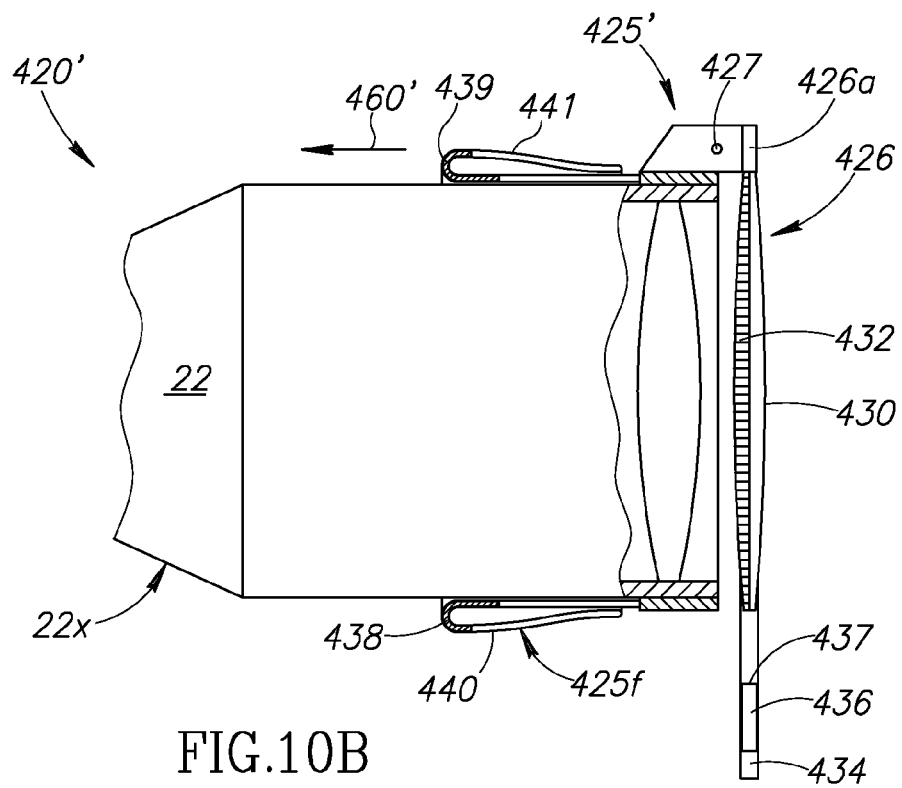
FIG. 10B is a plan view of another embodiment of the apparatus with a body that is folded onto a scope for use thereon, including a partially cut-away cross-sectional portion.

FIG. 10B shows an apparatus 420' with a body 425f similar to that of body 425r of apparatus 420. An important difference is that the body 425f is foldable. The body 425f is unfolded in the direction of arrow 460' and is folded in the opposite direction. All other components of the apparatus 420' are in accordance with those for apparatus 420 described above and shown in FIG. 10A. In FIG. 10B, the body 425f is in a folded orientation, immediately prior to its placement on the scope 22, at the end 22x.

Figure 11A:
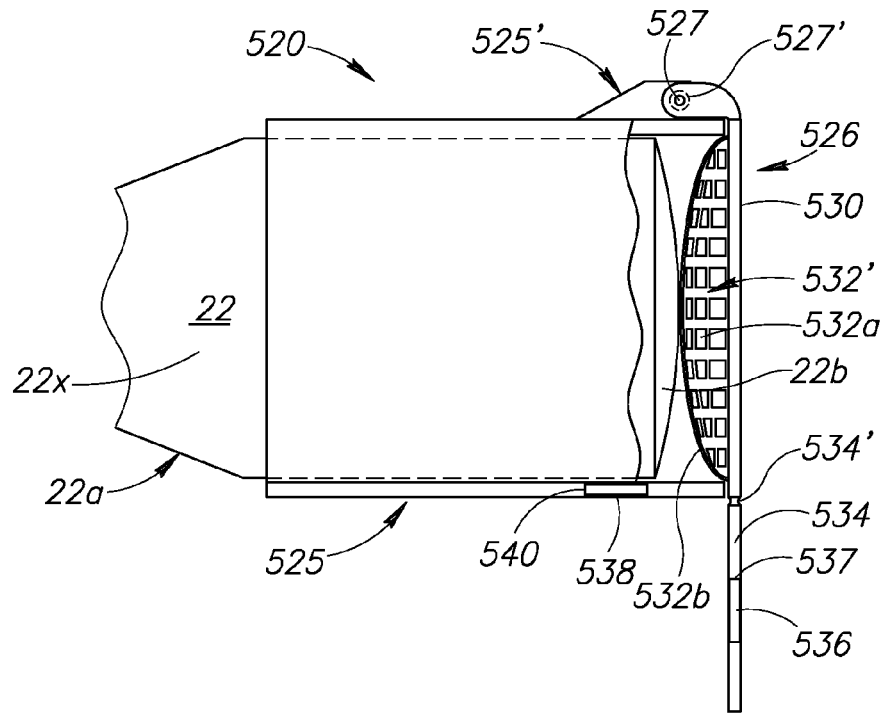
FIG. 11A is a plan view of another embodiment of the apparatus, with the cap in a closed position, including a partially cut-away cross-sectional portion.
Figure 11B:
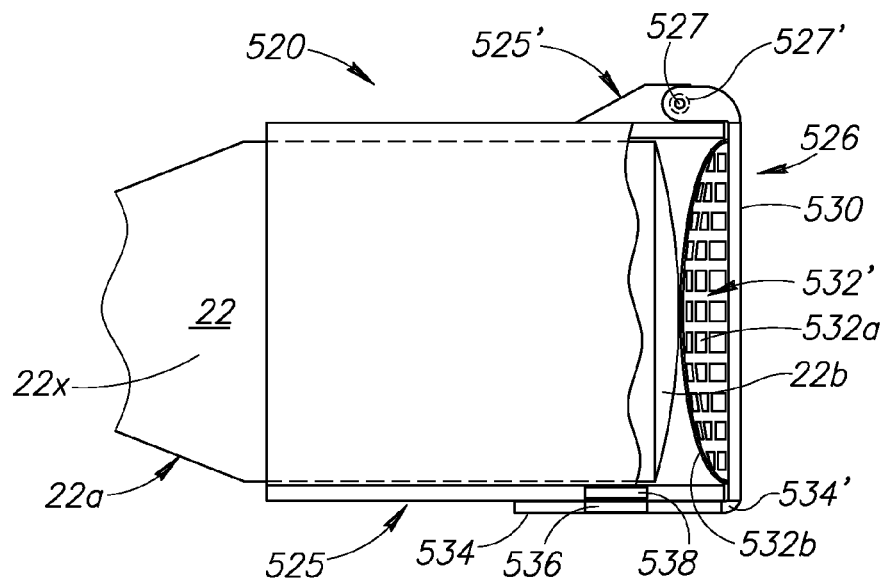
FIG. 11B is a side view of the embodiment of the apparatus of FIG. 11A, with the cap secured in a closed position. This figure also includes a partially cut-away cross-sectional portion.
Figure 11C:
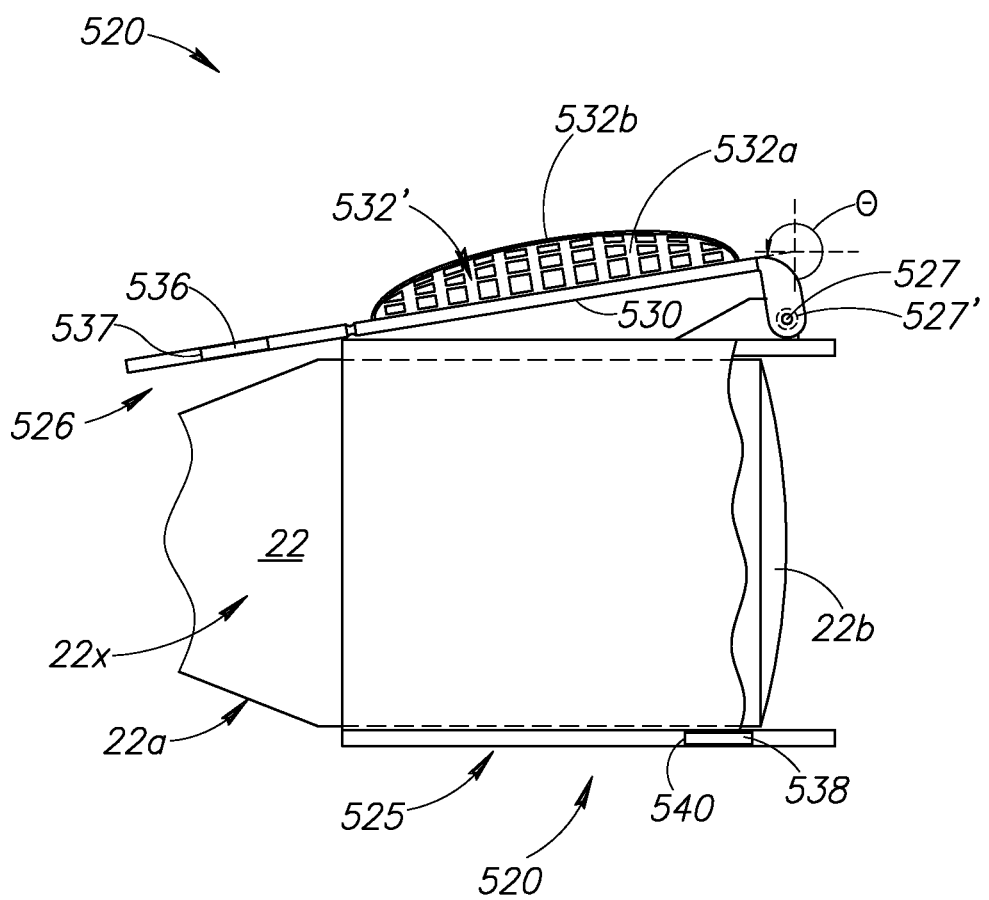
FIG. 11C is a plan view of the embodiment of the apparatus of FIGS. 11A and 11B with the cap in an open position, including a partially cut-away cross-sectional portion.

FIGS. 11A-11C show another embodiment of an apparatus 520 in accordance with the present invention. Apparatus 520 is similar to apparatuses 320, 420, 420' of FIGS. 9A-9D and, 10A and 10B, respectively, in construction and components, except where indicated. The apparatus 520 includes a body 525, similar to bodies 425r or 425f, detailed above. Apparatus 520 also includes a cap 526, attached to the body in accordance with the way cap 326 is attached in apparatus 320 and cap 426 is attached in apparatus 420, as disclosed above. In FIG. 11A, the cap 526 is closed, but magnet 536 in pocket 537 of tab 534 is not yet engaged with magnet 538 in pocket 540. In FIG. 11B, the cap 526 is secured closed, with magnet 536 engaged with magnet 538. In this apparatus 520, a spring 527' is positioned around pin 527. Similar to the embodiments discussed above, pin 527 allows the arm of cap 526 to hingedly attach to receiver 525' of body 525. The spring 527' biases the cap 526 in the open position, clear of the lens 22b of scope 22 at end 22x, as shown in FIG. 11C. The cap 526 is held securely in this open position by the biasing force of the spring 527'.

The biasing of spring 527' eliminates the need for magnets on the corresponding side of the body 525. Spring 527' firmly and securely maintains the cap 526 at an orientation represented by the arc θ in FIG. 11C. The arc θ is approximately 280°, measured from the orientation of the cap 526 in the closed position, as shown in FIGS. 11A and 11B to the open position shown in FIG. 11C. However, magnets in the body 525, similar to the magnets 439 in body 425r or holder 441 may exist in other embodiments.

The cap 526 is similar to caps 326 and 426, except that the inner portion 532' protrudes with a support member 532a. Accordingly, inner portion 532' is bulged or convex. This causes inner material layer 532b, which covers the support member 532a, to be in contact with lens 22b. The support member 532' is compressible, and is covered by a material layer 532b. The material layer 532b is a moisture-absorbent and/or moisture-wicking material, such as disclosed in conjunction with inner portion 32 and inner portion 432 above. The inner portion 532', depending on the position of lens 22b in the scope 22, may be in at least partial abutment with the lens 22b. The outer portion 530 of cap 526 is preferably of a resilient material, (e.g, polymer such as a plastic, silicone, rubber or the like). Tab 534 may include an indentation 534', permitting it to bend easily, allowing magnets 536 and 538 to easily engage, thereby securing cap 526 in the closed position, as shown in FIG. 11B.

FIGS. 12A-12F show an apparatus 620, and specific portions thereof. The apparatus 620 is similar to the apparatus 520 of FIGS. 11A-11C, except where indicated hereinbelow. The apparatus 620 has a body 625, similar to body 525 detailed above, and a cap 626, attached to the body 625, generally in accordance with the description for apparatus 520. That is, cap 626 includes an arm 626a which fits between oppositely disposed members or bosses 625a and 625b of receiver portion 625' of body 625. As in other embodiments detailed above, the body 625 has a proximal end 629 and a distal end 628, with the cap 626 attaching at the distal end 628. A pin 627 and a spring 627' fit within the arm receiver 625' and arm 626a to define a hinge that is spring-biased to hold the cap 626 in the open position. As with previous embodiments, the outer portion 630 of the cap 626 is of a flexible, resilient material, such as silicone, rubber, or the like. The cap 626 has an inner portion 632 with a support member 632a, similar to elements 532' and 532a detailed above.

Figure 12A:
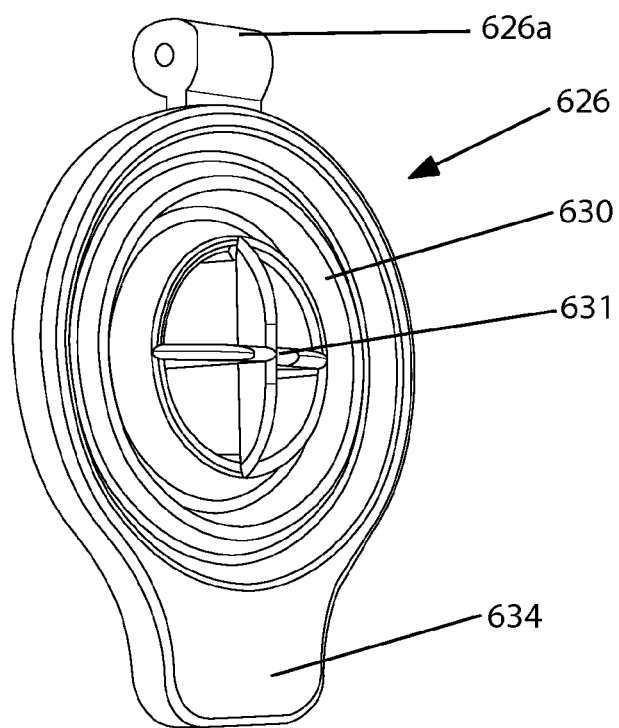
FIG. 12A is a front perspective view of a cap of another embodiment of the apparatus.
Figure 12B:
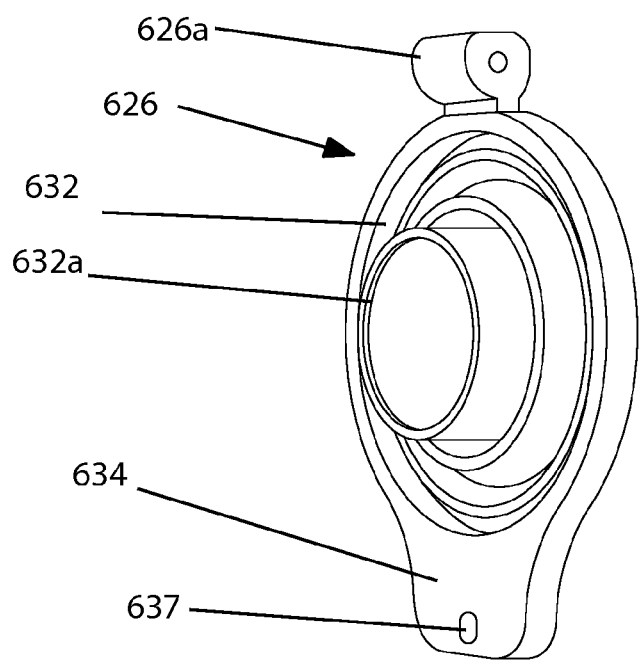
FIG. 12B is a back perspective view of the cap of the embodiment of the apparatus of FIG. 12A.
Figure 12C:
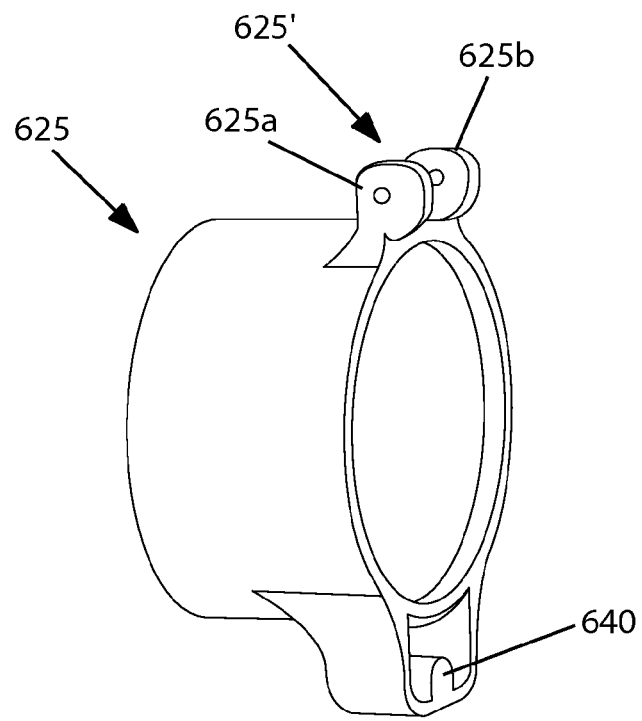
FIG. 12C is a front perspective view of a body of an embodiment of the apparatus corresponding to the cap of FIGS. 12A and 12B.
Figure 12D:
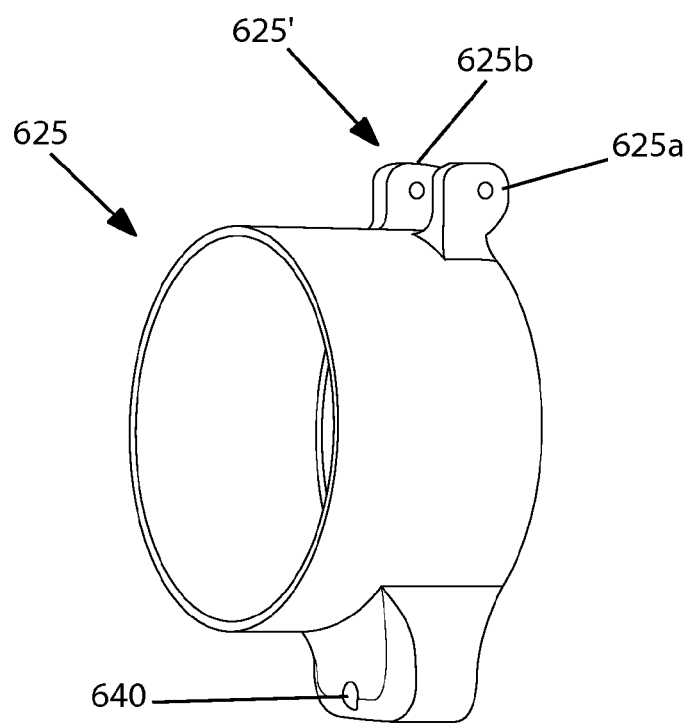
FIG. 12D is a back perspective view the a body of the embodiment of the apparatus of FIG. 12C.
Figure 12E:
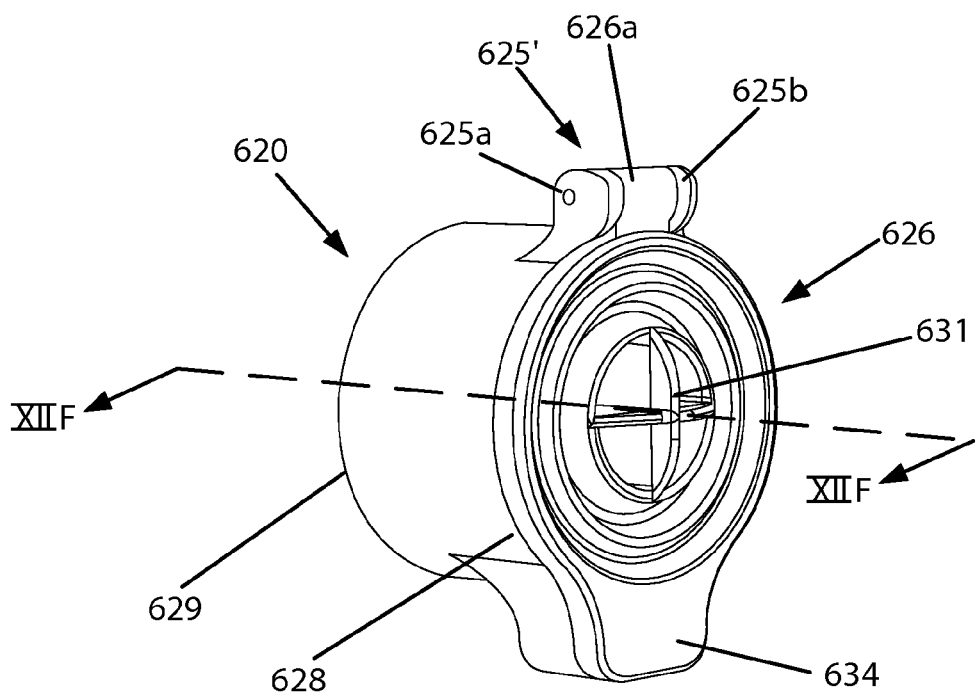
FIG. 12E is a front perspective view of the embodiment of the apparatus of FIGS. 12A through 12D.
Figure 12F:
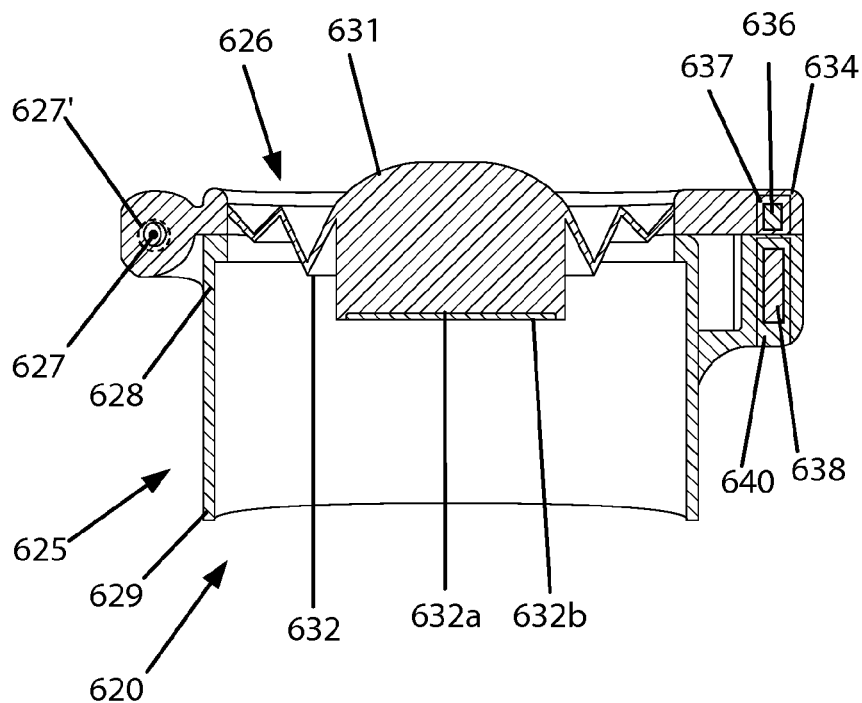
FIG. 12F is a cross-sectional view of the embodiment of the apparatus of FIG. 12E, taken along line XIIF-XIIF of FIG. 12E.

Adhered to support member 632a is a material layer 632b, which, to give an unobstructed view of other parts of the cap 626, is not shown in FIG. 12A or 12B. The material layer is shown in FIG. 12F. The material layer 632b is, for example, a moisture-absorbent and moisture-wicking material, as described for the cap inner portion 632. Preferably the material layer 632b is chamois cloth or microfiber. Most preferably, the material layer 632b is microfiber. The outer portion 630 of cap 626 includes a finger grip portion 631, allowing a person to easily bend and manipulate the flexible material of the cap 626, which in turn, causes the support member 632a and the material layer 632b covering it, to move correspondingly. The accordion-like design of the cap, which includes bellows or ridges, aids in allowing the cap to be bent and manipulated, moving the support member 632b and material layer 632b accordingly. When the cap 626 is in the closed position, manipulating the finger grip portion 631 allows a person to reach and clean every portion of lens 22b with the material layer 632b covering the support member 632a.

The cap 626 includes a tab 634 having a holder 637. Holder 637 contains a magnet 636. The body 625 includes a corresponding holder 640 containing a magnet 638 arranged with an opposite polarity of magnet 636. Together, the magnets 636 and 638 secure the cap 626 in a closed position when the cap 626 is closed. During manufacturing, holder 637 and holder 640 are hollowed-out sections, which then each receive a magnet 636 and 638, and then are back-filled to secure in place the magnets 636 and 638.

Although embodiments of the present invention may be of various dimensions, depending on the dimensions of the corresponding viewing device, example dimensions are provided as follows: The body 625 has an inner diameter of about 1.7 inches and an outer diameter of about 1.9 inches. Holder 640 has a diameter of about $\frac{1}{8}^{th}$ inch. Holder 637 has a diameter of about $\frac{1}{8}^{th}$ inch. Support member 632a has a diameter of about 0.8 inches.

Regarding the preferred hardness of various portions of the apparatus, oppositely disposed members or bosses 625a and 625b of receiver portion 625' of body 625 are desirably about 60 durometer in hardness. The body 625 is desirably about 30 durometer in hardness.

FIGS. 13A-13F collectively depict an apparatus 720, and in particular figures, particular portions of the apparatus 720. Apparatus 720 is the most preferred embodiment of an apparatus according to the invention. The apparatus 720 is similar to apparatus 620, discussed above, with certain differences as shown in the figures and as discussed herein. Apparatus 720 has a body, shown and labeled as item 725 in FIGS. 13C, 13D, and 13F. As can be appreciated best in FIG. 13D and the cross-sectional view in FIG. 13F, the diameter of body 725 tapers down from the distal end 728 to the proximal end 729. Cap 726 attaches to body 720 at the distal end 728 by way of an arm 726a located between oppositely-disposed members or bosses 725a and 725b of receiver 725' on the body 720. A pin 727 and a spring 727' fit within receiver 725' to define a hinge that is spring-biased to hold the cap 726 in the open position. The outer portion 730 of the cap 726 is of flexible, resilient material. The cap 726 has an inner portion 732 with a support member 732a, similar to support member 632a discussed with reference to FIGS. 11A through 11F, above.

Figure 13A:
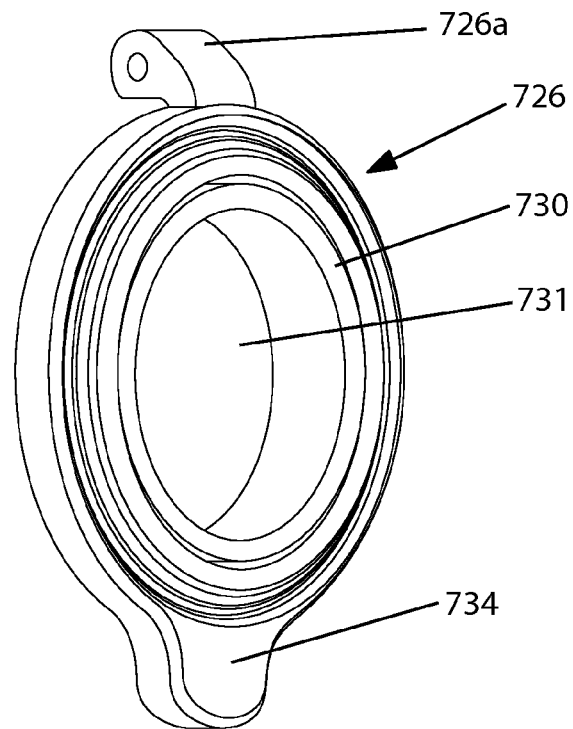
FIG. 13A is a front perspective view of a cap in accordance with the most preferred embodiment of the apparatus.
Figure 13B:
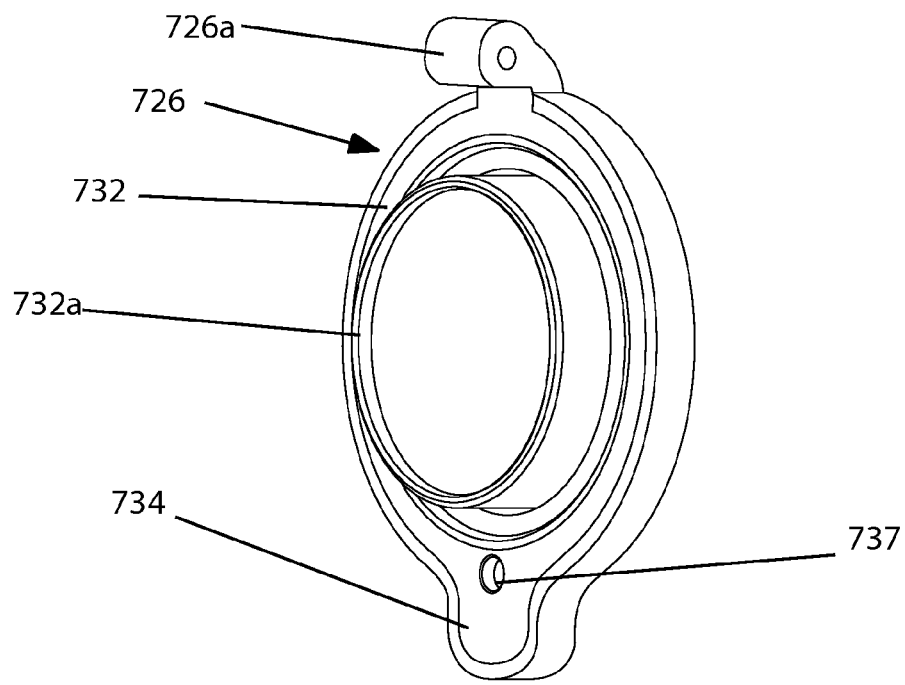
FIG. 13B is a back perspective view of the cap in accordance with the most preferred embodiment of the apparatus.
Figure 13C:
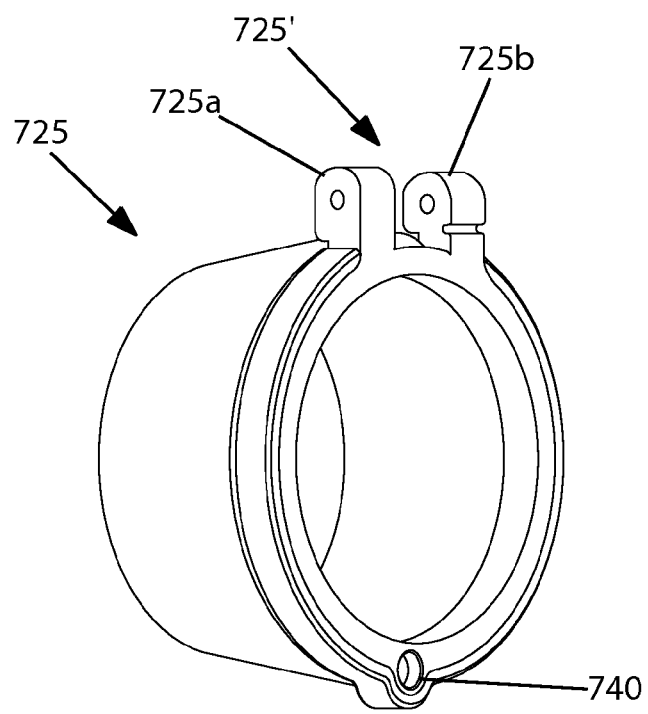
FIG. 13C is a front perspective view of a body in accordance with the most preferred embodiment of the apparatus.
Figure 13D:
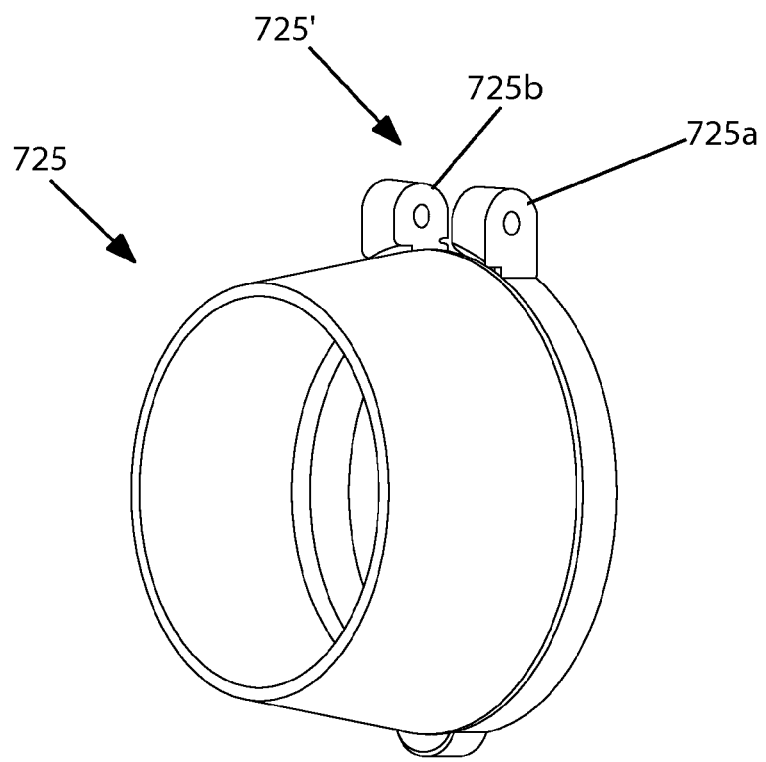
FIG. 13D is a back perspective view of the body in accordance with the most preferred embodiment of the apparatus.
Figure 13E:
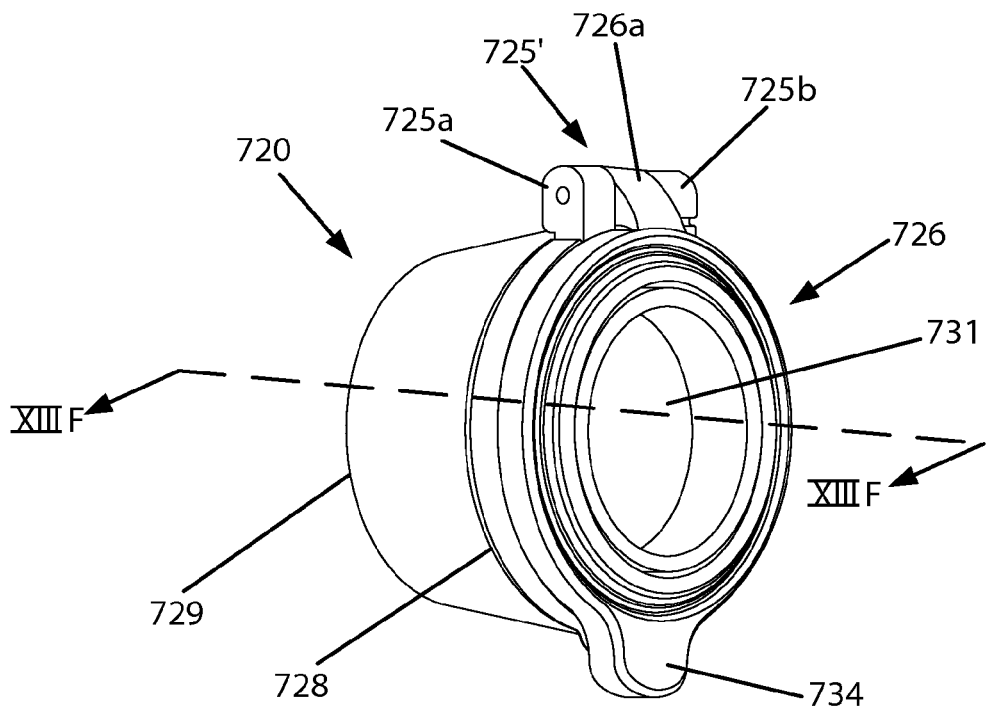
FIG. 13E is a front perspective view of the most preferred embodiment of the apparatus.
Figure 13F:
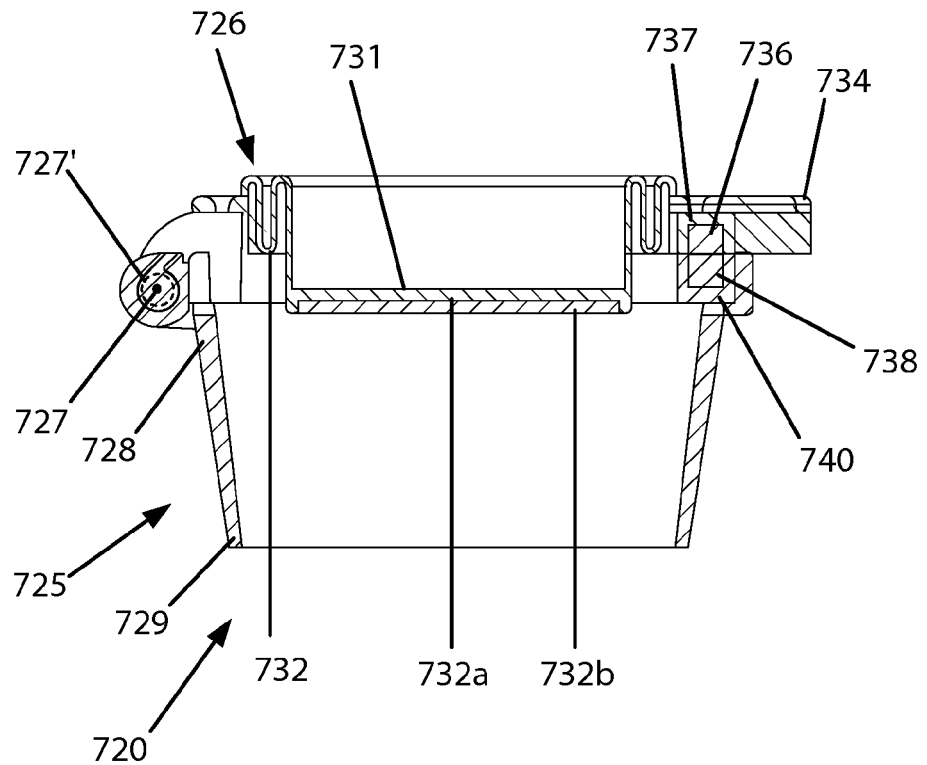
FIG. 13F is a cross-sectional view of the most preferred embodiment of the apparatus, taken along line XIIIF-XIIIF of FIG. 13E.

As shown most clearly in FIGS. 13A, 13E, and 13F, the cap has an accordion-like design, with bellows or ridges, allowing the cap to expand into the body towards the lens of a viewing device, when force is applied to the outer portion 730 of the cap 726. A moisture-absorbent and moisture-wicking layer of material 732b is adhered to support member 732a, as shown in FIG. 13F. Preferably the material layer 732b is chamois cloth or microfiber. Most preferably, it is microfiber. The layer of material is not shown in FIGS. 13A and 13B, so that other components of the cap 726 can be clearly seen. On the outer portion 730 of cap 726 is a recessed portion 731 allowing a person to insert a finger and bend and manipulate the flexible material of the cap 726. By manipulating the cap 726 in this way with cap 726 in the closed position, support member 732a and the material layer 732b move correspondingly to clean a lens.

At the bottom of cap 726 is a tab 734, which a person can manipulate to rotate the cap 726 between the closed and open positions. As shown in FIG. 13F, cap 726 includes a holder 737 for a magnet 736. During manufacturing, holder 737 includes a hollowed-out section in the cap 726. A magnet 736 is then inserted into holder 737. In certain embodiments, after inserting magnet 736, holder 737 is back-filled. In preferred embodiments, the magnet 736 occupies the entire hollowed-out section such that when magnet 736 is fully inserted, it is flush with the opening of holder 737. This is shown in FIG. 13F. In these preferred embodiments, holder 737 is dimensioned such that magnet 736 must be pressed into place with significant force and is thereafter frictionally retained in position. In certain embodiments, adhesives may be used in addition to or instead of frictionally retaining the magnet 736 in the holder 737. Likewise, body 725 contains a corresponding magnet 738 of opposite polarity inside a holder 740. Similarly to holder 737, holder 740 includes a hollowed-out section during the manufacturing process. Magnet 738 is then inserted into holder 740. In certain embodiments, holder 740 is then filled, sealing magnet 738 within the holder 740. In preferred embodiments, magnet 738 occupies the entire hollowed-out section of holder 740, such that when magnet 738 is fully inserted, it is flush with the opening of holder 740. This is shown in FIG. 13F. In these preferred embodiments, holder 740 is dimensioned such that magnet 738 must be pressed into place with significant force and is thereafter frictionally retained in position. In some embodiments, adhesives may be used in addition to or instead of frictionally retaining magnet 738 in holder 740.

Once the cap 726 is closed, magnets 736 and 738 hold cap 726 in the closed position, overcoming the bias of spring 727'. The attractive force of magnets 736 and 738 can be overcome by a reasonable amount of force to open the cap again. The cap 726 includes a frame 735 made of plastic, metal, or similar rigid material. The receiver 725' is also preferably made of relatively rigid material, such as plastic or metal. The remainder of the cap 726 is made of flexible, resilient material, such as silicone or rubber. The body 725 also includes a frame 723 of relatively rigid material, such as plastic or metal. The bosses 725a and 725b are also relatively rigid and made of the same or similar material as the frame 723. The rest of the body 725 is made of flexible material such as silicone or rubber.

While preferred embodiments have been described, so as to enable one of skill in the art to practice the disclosed subject matter, the preceding description is intended to be exemplary only. It should not be used to limit the scope of the disclosed subject matter, which should be determined by reference to the following claims.

The invention claimed is:

1. An apparatus for drying a recessed lens of a tubular outdoor viewing device comprising:
 a tubular body configured for positioning and retention over an end of the viewing device proximate to the lens; and
 a cap in communication with the body, the cap dimensioned to be movable with respect to the body, and the cap configured for moving between positions including a position where the cap covers the lens, and a position where the cap is maintained at least substantially clear of the lens, such that the apparatus remains on the viewing device while the viewing device is in use, the cap including:
 an inner portion adapted for contacting the lens when the cap is in the position where the cap covers the lens,
 a layer of moisture-wicking material covering at least a part of the inner portion, and
 an outer portion adapted so that, when the cap is in the position where the cap covers the lens, a user causes the layer of moisture-wicking material to contact and move about the lens by manipulating the outer portion, thereby drying the lens.

2. The apparatus of claim 1, wherein the cap is attached to the body by a hinged attachment.

3. The apparatus of claim 2, wherein the hinged attachment includes a resilient material which exhibits spring-like behavior.

4. The apparatus of claim 2, wherein the hinged attachment includes a first cooperating member on the cap and a second cooperating member on the body.

5. The apparatus of claim 1, wherein the body includes a first magnet and the cap contains a second magnet of opposite polarity to the first magnet, the first and second magnets being positioned such that when the cap is in the closed position, the first and second magnets are magnetically engaged and when the cap is in the open position, the magnets are not magnetically engaged.

6. The apparatus of claim 1, wherein the body includes oppositely disposed first and second holding structures, and the cap includes a cooperating holding structure for engaging: i) the first holding structure on the body when the cap covers the lens, and ii) the second holding structure on the body when the cap is maintained at least substantially clear of the lens.

7. The apparatus of claim 6, wherein the first holding structure, the second holding structure, and the cooperating holding structure are each magnetic.

8. The apparatus of claim 7, wherein the first holding structure, second holding structure, and cooperating holding structure each include at least one magnet.

9. The apparatus of claim 8, wherein the at least one magnet of each of the first holding structure and second holding structure are of the same polarity and the at least one magnet of the cooperating holding structure is of a polarity opposite the polarity of the at least one magnet of each of the first holding structure and second holding structure.

10. The apparatus of claim 6, wherein the cap includes a tab, the tab including the cooperating holding structure.

11. The apparatus of claim 1, wherein the viewing device includes binoculars, a telescope, a camera, or a scope for a rifle, gun, pistol, or firearm.

12. The apparatus of claim 1, wherein the inner portion of the cap includes a convex support member.

13. The apparatus of claim 1, wherein the cap includes baffles or ridges which allow the cap to extend inwards, into the body when the cap is in the closed position and force is applied to the outer portion of the cap.

14. The apparatus of claim 1, wherein the cap and body each comprise:
 flexible, resilient material; and
 a shape-giving frame of rigid material.

15. The apparatus of claim 1, wherein the tubular body is adapted to be rollable or foldable.

16. A method for drying a lens of a tubular outdoor viewing device using an apparatus comprising:
- a tubular body configured for positioning and retention over an end of the viewing device proximate to the lens; and
- a cap in communication with the body, the cap being adapted to be extendable into the body and into contact with the lens, the cap including a layer of moisture-wicking material, and the cap being configured for moving between positions including a position where the cap covers the lens, and a position where the cap is maintained at least substantially clear of the lens, such that the apparatus remains on the viewing device while the viewing device is in use;

the method comprising:
placing the apparatus over the viewing device; and,
moving the cap so that the layer of moisture-wicking material comes into contact with the lens, thereby drying the lens.

17. The method of claim 16, wherein moving the cap into contact with the lens includes moving the cap from i) the position where the cap covers the lens, or ii) the position where the cap is maintained at least substantially clear of the lens.

18. The method of claim 16, additionally comprising:
moving the cap to: i) the position where the cap covers the lens, or ii) the position where the cap is maintained at least substantially clear of the lens after matter has been removed from the lens.

19. The method of claim 18, wherein moving the cap to: i) the position where the cap covers the lens, or ii) the position where the cap is maintained at least substantially clear of the lens, includes securing the cap in position.

20. The method of claim 16, wherein the viewing device includes binoculars, a telescope, a camera, or a scope for a rifle, gun, pistol, or firearm.

21. In an apparatus comprising:
- a tubular body configured for positioning and retention over an end of the viewing device proximate to the lens, the tubular body including a shape-giving frame of a rigid material;
- a magnet attached to the tubular body;
- a cap attached to the body by a hinged attachment, the cap dimensioned to be movable with respect to the body, and the cap configured for moving between positions including a position where the cap covers the lens, and a position where the cap is maintained at least substantially clear of the lens, such that the apparatus remains on the viewing device while the viewing device is in use, the cap comprising:
  an outer portion,
  an inner portion,
  a tab extending from the cap, the tab including at least one magnet dimensioned to attractively interact with the at least one magnet on the tubular body when the cap is in the position where the cap covers the lens, and
  a shape-giving frame of rigid material;

the improvement comprising:
the inner portion being adapted for contacting the lens when the cap is in the position where the cap covers the lens;
a layer of moisture-wicking material attached to the inner portion; and
the cap further having at least one ridge adapted to allow the inner portion of the cap to extend inwards into the body to bring the layer of moisture-wicking material into contact with the lens when the cap is in the position where the cap covers the lens and force is applied to the outer portion of the cap.

* * * * *